United States Patent
Touboul

(12) 
(10) Patent No.: US 6,658,465 B1
(45) Date of Patent: Dec. 2, 2003

(54) METHOD AND APPARATUS FOR MONITORING AND CONTROLLING PROGRAMS IN A NETWORK

(75) Inventor: Shlomo Touboul, Kfar Haim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/447,529

(22) Filed: Nov. 23, 1999

Related U.S. Application Data

(63) Continuation of application No. 08/918,783, filed on Aug. 25, 1997.

(51) Int. Cl.[7] .............................................. G06F 15/173

(52) U.S. Cl. ........................ 709/223; 709/220; 709/221; 709/224; 709/225; 709/226

(58) Field of Search ................................ 709/223–226; 717/168–178

(56) References Cited

U.S. PATENT DOCUMENTS

| | | |
|---|---|---|
| 4,965,772 A | 10/1990 | Daniel et al. |
| 5,105,382 A | 4/1992 | Ogasawara |
| 5,153,909 A | 10/1992 | Beckle et al. |
| 5,193,178 A | 3/1993 | Chillarege et al. |
| 5,193,189 A | 3/1993 | Flood et al. |
| 5,206,948 A | 4/1993 | De Angelis et al. |
| 5,220,593 A | 6/1993 | Zicker et al. |
| 5,283,856 A | 2/1994 | Gross et al. |
| 5,325,517 A | 6/1994 | Baker et al. |
| 5,367,670 A | 11/1994 | Ward et al. |
| 5,394,543 A | 2/1995 | Hill et al. |
| 5,423,000 A | 6/1995 | Kimura et al. |
| 5,471,617 A | 11/1995 | Farrand et al. |
| 5,835,777 A | * 11/1998 | Staelin |

FOREIGN PATENT DOCUMENTS

| | | |
|---|---|---|
| EP | 0 333 620 A2 | 3/1989 |
| GB | 2 254 522 A | 1/1992 |

OTHER PUBLICATIONS

Wolfgor et al., "Maintenance of System Software on a Wide Area Network of Mainframes", pp. 113–119, 1991.*

Computer Organization, Third Edition, V. Carl Hamacher, et al., McGraw–Hill, 31 pp., 1990, NY.

(List continued on next page.)

*Primary Examiner*—John Follansbee
*Assistant Examiner*—Tim Vo
(74) *Attorney, Agent, or Firm*—Blakely, Sokoloff, Taylor & Zafman LLP

(57) ABSTRACT

A system for monitoring and controlling at least one program capable of being executed on any one of at least two workstations in a network. The network includes at least one agent module resident on each of the at least two workstations and a management console connected to each of the at least two workstations. The system includes modules for identifying an event occurring with respect to a program executing on one of the at least two workstations, modules for sending an alert to the management console which identifies the event, memory for storing a plurality of triggers, each of the triggers adapted to cause an action to be taken within the network, memory for storing at least one procedure, the at least one procedure comprising at least one of the plurality of triggers, and modules for sending at least one of the procedures from the management console to the agent module resident on the one of the at least two workstations in response to receipt of the alert. A method is also provided for monitoring and controlling programs capable of being executed on any of at least two workstations in a network.

28 Claims, 15 Drawing Sheets

OTHER PUBLICATIONS

Data Comm Magazine, "Troubleshooting Applications From the Inside", P. Heywood, 1/93, 2 pp.

PC Magazine, "AlertView Sends Alarms and Repairs Across the LAN", S. Rigney, 3/93, 1 pg.

AlertView Event Monitor Brochure (AVEM), 4 pp.

AlertView Manager (AVM) Brochure, 2 pp.

AlertView Station (AVS) Brochure, 2 pp.

IBM Tech. Discl. Bulletin, V. 36 N. 8, 8/93, "Remote Control Session", pp. 93–97, NY.

IBM Tech. Discl. Bulletin, V. 37 N. 4B, 4/94, "Customizing The LAN NetView Fix Action Table", p. 115, NY.

Computer Systems And Software Engineering Fifth Israel Conference on IEEE Comput. Soc.

"Maintenance of System Software on A Wide Area Network of Mainframes", Wolfgor, O., 5/91, 11 pp., CA.

* cited by examiner

METHOD AND APPARATUS FOR MONITORING AND CONTROLLING PROGRAMS IN A NETWORK

This is a continuation of application Ser. No. 08/918,783, filed on Aug. 25, 1997, this is currently pending.

BACKGROUND

The present invention is directed to a method and apparatus for controlling programs in a network. In particular, the present invention is directed to a method and apparatus which automatically detects and corrects error conditions occurring in programs running on network workstations.

Today's networks are expanding in size and complexity. A network administrator is typically in charge of planning, organizing and maintaining the network. His responsibilities include trobleshooting not only network hardware and software problems, but hardware and software problems on each of the workstations in the network. As much as eighty percent of his time can be spent on troubleshooting problems on the workstations, including problems specific to each program that the users may be running. Until the network administrator can fix the problem for a user, the workstation may be down. Such downtime can be costly for any organization whose operations depend upon proper functioning of the network and its workstations. Further, because the network administrator must be able to diagnose and fix any problem that can occur with all the programs that are running on the network, he must be a highly skilled individual with at least a working knowledge of all network programs.

The present invention relates to a system for assisting the network administrator in solving the problems encountered in the network. A number of earlier versions of the program according to the present invention have been available in the marketplace for more than one year which will detect network problems and report them. The newest of these versions, released November 1992, is AlertVIEW™, Version 2.0, available from Shany, Inc., Mountain View, Calif. These earlier versions can inform the network administrator that a problem exists with a particular application program running on one of the network workstations. However, the prior versions have only a limited capability in that they can only send a single command, or trigger, to the workstations in response to the detection of the problem, that is, upon receipt of an alert at a management console. In particular, the management console sends a trigger causing one of the following actions to occur: freeze, unfreeze, or reboot a workstation, start and stop a program running in the foreground, send a message, or send any single command in the form of a custom trigger, that the user indicates should be performed in response to specific alerts.

SUMMARY

It is accordingly an object of the present invention to improve upon the earlier versions of the above-noted program in a manner which offers increased flexibility in the handling of problems that occur at workstations.

It is an object of the present invention to provide a network maintenance system which can identify failures of programs running on network workstations and take the appropriate corrective action to correct the problems that led to those failures.

It is another object of the present invention to provide a system which can correct problems occurring on workstations within the network by sending procedures to agents active on the workstations, each procedure consisting of one or more actions to be taken.

It is another object of the present invention to provide a network maintenance system which allows integrated remote access and control of the network workstations by the network administrator.

It is another object of the present invention to provide a system which allows the network administrator to schedule the automatic performance of network administration and maintenance tasks.

It is another object of the present invention to provide a system which allows the network administrator to automatically send keystroke jobs to the workstations in the network.

It is another object of the present invention to provide a system which allows automatic discovery of agents.

It is another object of the present invention to provide a system which provides specific agents which are developed so as to be tailored to specific applications.

According to one embodiment, a system is provided for controlling at least one program capable of being executed on any of at least two workstations in a network. The network includes at least one agent module resident on each of the workstations and a management console connected to each of the workstations. The system comprises means for identifying an event occurring with respect to a program executing on one of the workstations, means for sending an alert to the management console which identifies the event, and means for storing a plurality of triggers. Each of the triggers is adapted to cause an action to be taken within the network. The system further comprises means for storing at least one procedure, the procedure comprising at least one of the triggers, and means for sending at least one of the procedures from the management console to the agent module resident on the one of the workstations in response to receipt of the alert.

According to another embodiment, a system for monitoring and controlling at least one program in a network is provided. The network comprises at least two workstations and a management console connected to each of the workstations. The system comprises at least one generic agent means resident on each of the workstations for transmitting alerts indicating occurrence of an event with a program executing on the workstation, and monitor means resident on the management console for logging alerts transmitted by any of the agent means. The system further includes means for storing a plurality of triggers to be sent from the monitor means to the agent means, the triggers comprising commands which cause actions to be taken by the agent means in response to the event, means for defining at least one procedure, the procedure including at least one of the stored triggers, and manager means for monitoring and controlling operations of the agent means, the manager means comprising means for sending the procedure to the agent means in response to an alert.

According to another embodiment, a method is provided for monitoring and controlling at least one program capable of being executed on any of at least two workstations in a network. The network comprises at least one agent module resident on each of the workstations and a management console connected to each of the workstations. The method comprises the steps of storing a plurality of triggers, each of the triggers adapted to cause an action to be taken within the network, storing at least one procedure, the procedure comprising at least one of the plurality of triggers, identifying an event occurring on one of the workstations, sending an alert to the management console which identifies the event, and sending at least one of the procedures from the management console to the agent module resident on the workstation in response to receipt of the alert.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the system, given only by way of example, and with reference to the accompanying drawings, in which.

GENERAL DESCRIPTION

Figure 1:
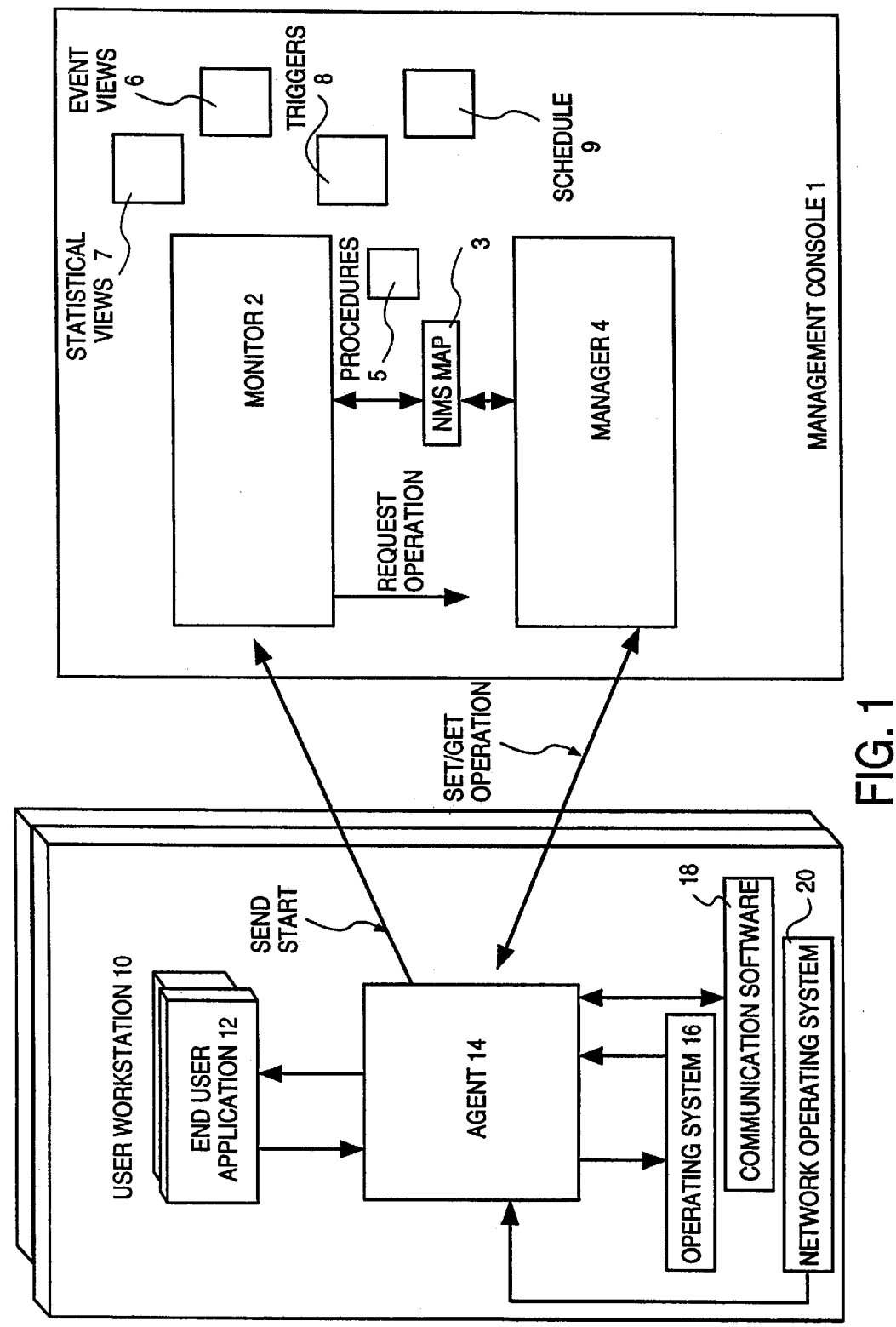
FIG. 1 is a block diagram of the network system in accordance with an embodiment of the present invention.

The present invention relates to a network management tool that provides real-time solutions to network programs' problems by monitoring and controlling programs executing on the workstations in the network. The reference herein to programs includes communication software, network operating systems programs, operating system programs and end user applications programs.

The system according to the present invention detects, reports, corrects and prevents end-user program errors, which represent the most common, difficult, and time consuming class of problems. The system according to the present invention can significantly reduce users' downtime, provide real-time control and support of all network programs, free the network administrator from frustrating hours of troubleshooting, and allow the administrator to manage the network with optimum efficiency. The system transforms troublesome user support tasks into satisfying results oriented experiences, by focusing on the programs.

The system according to the present invention allows the administrator to schedule procedures which automatically initiate housekeeping tasks required to ensure that programs continuously run smoothly. The system retains information for preemptive analysis of the network programs problems, which can be used to prevent problem reoccurrences. This information can also be used to maintain the network by designating scheduling procedures which perform necessary actions on the workstations to ensure its safe operation and by designating correction procedures which react to the appearance of smaller problems to prevent the occurrence of bigger problems. The system according to the present invention also manages its own scheduled procedures, guaranteeing successful completion for the maintenance and backup tasks.

The system according to the present invention includes an agent resident on the network workstations which actively monitors interaction between the users, applications, and system software, providing the network administrator with real-time detection of problems. Important event details are continually captured, including information that is unavailable or incomprehensible to the users. For purposes of this description, an event is the occurrence of a problem with an interrupt or program on a workstation. The system according to the present invention provides real-time problem solving and provides the administrator with invaluable data that identifies and informs the administrator of the problem, its location, the program during which it occurred, and the recommendation for correcting it. The elimination of countless, frustrating hours of guesswork time is achieved because the system according to the present invention detects the source of the security violations, error messages, frozen stations, and other time consuming problems.

Via the network, the agent according to the present invention transmits an alert containing comprehensive, detailed information about each event as it occurs, allowing the network administrator to focus and address printing errors, security violations, and other program errors critical to the smooth operation of the network. The system guarantees accurate, complete communication of all reported details. Nothing is lost to limited or inadequate communication with the system's memory capabilities. The system actively reports critical program problems directly to the network administrator, regardless of where he/she is, via electronic mail, modem or network, allowing the administrator to customize the reporting procedures. Complete reporting of information needed to achieve a clear understanding of the problem, including, for example, detailed reporting on the application file servers, print queues, etc. which were involved in the event which caused the alert, allows the network administrator to quickly solve the network's problems.

In a typical network, forty percent of the problems encountered by users of the workstations repeat themselves each day. The system according to the present invention will automatically correct these problems, allowing user support time to be converted into valuable productive time and freeing the administrator from the timely hours of support calls. The system analyzes the existing alerts to determine the appropriate corrective procedure for each event, providing the network administrator immediate solutions without the guess work. The present invention differs from the prior versions of AlertVIEW™ described above in a number of ways, including but not limited to, the ability to send procedures consisting of more than one command, or trigger, to the agent to correct a problem on the workstation. This provides an advantage in that the programs according to the present invention have increased flexibility, versatility and power.

The system according to the present invention allows initiation of corrective action in the background, without having to disrupt the user's programs. Interactive analysis and correction are supported through the system's application control panel and remote access feature, giving the administrator complete control of the user's machine through a simple procedure. The application control panel provides a user interface enabling the network administrator through the management console to control and display various aspects of the end user's machine, including displaying running programs, starting and stopping programs, and redirecting system standard input and output.

For example, users often call network administrators with the complaint that they cannot print. The system according to the present invention automatically solves printing problems, virtually eliminating the single most common source of network and workstation support calls. The agent detects user attempts to use an unavailable printer and reports the condition by sending an alert over the network. Transparent to the user, the system's manager then proactively corrects the problem. Using the agent to redirect the printer, the system automatically connects the user to the network printer, asking the user to retry the print. The system provides a customized view of printing alerts that allows the administrator to optimize printing setups and prevent further problems.

Another example occurs when a user receives a system message "Too many open files". When a program, such as a complex database query, opens more files than were allocated in system setup, the agent detects the condition even before it is displayed to the user. The system reports a "Too many open files" alert to the system manager, which in turn corrects the situation by automatically triggering the agent to make appropriate changes to the configuration files and reboot the workstation. Since these changes can be made permanent, the system automatically prevents future occurrences.

Another example occurs when access is denied to a prospective user by the network operating system. The system's agent according to the present invention constantly monitors file activity on each workstation, detecting security and access violations as they occur. It reports each event with specific information about the accessed file and the nature of the violation. The system corrects and prevents continued serious security violations by enabling the network administrator to freeze or disconnect the offending workstation prior to the user gaining access to the file and before actually violating his privileges. It further prevents ongoing access problems by providing detailed information about every unsuccessful access attempt to the network administrator.

DETAILED DESCRIPTION

The present invention relates to a method and apparatus for managing the operation of network programs. According to a preferred embodiment, the present invention is implemented using a plurality of software modules to perform the monitoring, managing, and logging tasks.

FIG. 1 is a block diagram of the system according to one embodiment of the present invention. The network administrator has access to a computer, preferably not the network server terminal, on which the management console 1 is installed. The management console 1 consists of two main modules, the monitor 2 and the manager 4. The network includes a plurality of user workstations 10. Each workstation 10 includes one or more end user applications 12, an operating system 16, communication software 18, and a network operating system 20.

Figure 2:
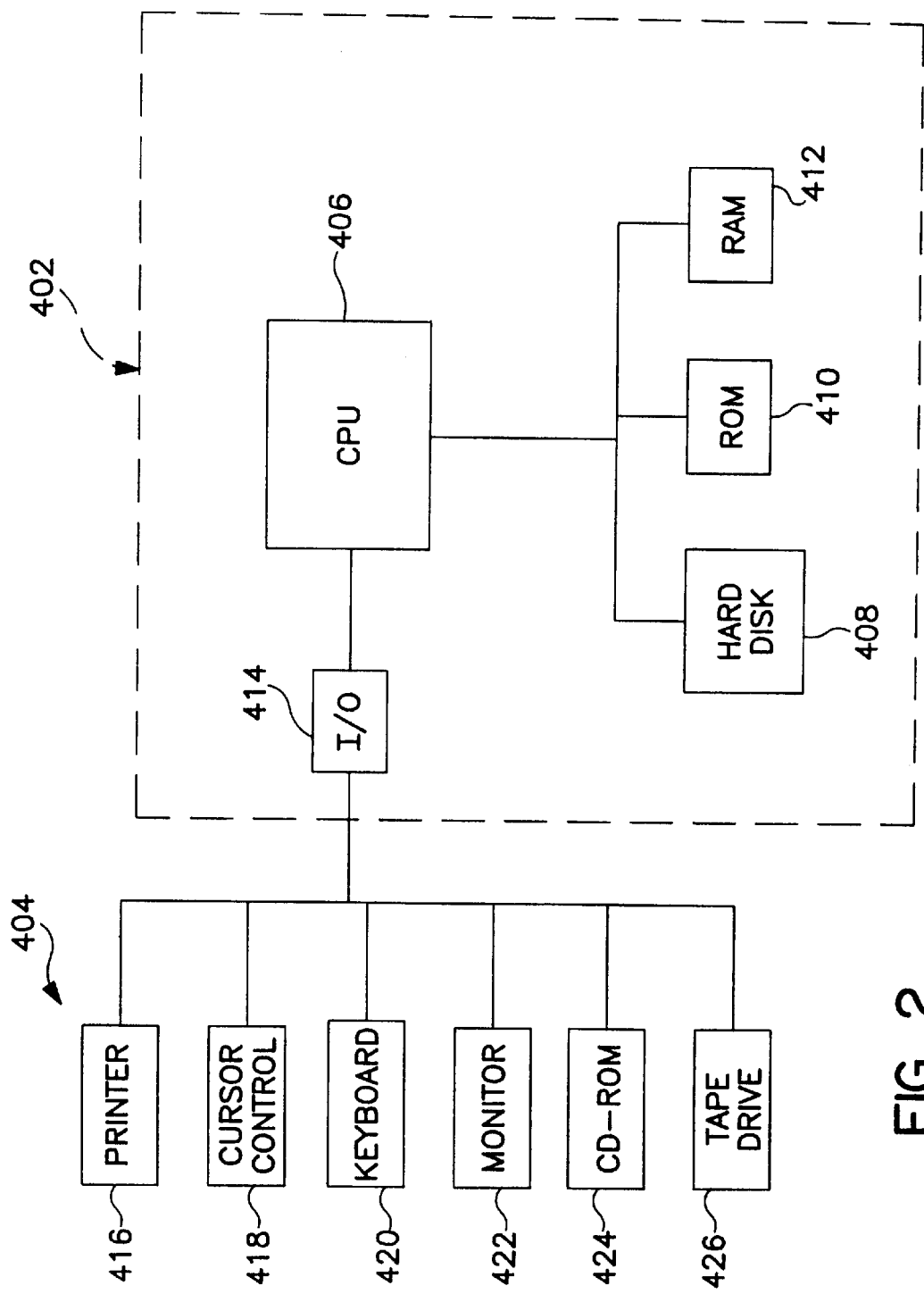
FIG. 2 is a block diagram of an exemplary embodiment of a computer system in accordance with the present invention.

FIG. 2 is a block diagram of a computer system for use in accordance with the present invention. The computer system of FIG. 2 is an exemplary embodiment of the workstation and management console computers. The particular configuration of the management console and workstation consoles to be used can be modified by one of ordinary skill in the art once in possession of the present disclosure. Computer 400 includes a main section 402 (shown in dashed lines) and a peripheral section 404. The main section 402 includes the central processing unit (CPU) 406, a hard disk 408, read only memory (ROM) 410, random access memory (RAM) 412 and an input/output (I/O) controller 414. The I/O controller 414 connects the main section 402 to the peripheral section 404. The peripheral section 404 includes, according to one embodiment, a printer 416, a cursor control 418, a keyboard 420, a video monitor 422, a CD-ROM reader 424, and a tape drive 426. The peripherals can be changed according to the needs of the user, as can the components of the main section. According to one embodiment, the various routines and files which implement the invention are stored on the hard disk 408 and the routines are executed by the CPU 406. The cursor control 418 can be a mouse, pen, or any other comparable device.

Returning to FIG. 1, the network management system (NMS) map module 3 is connected to the monitor 2 and the manager 4. The module 3 provides mapping integration for NOVELL™'s network management system map. In particular, the routine modifies the icon color on the map to show that the agent is running on the workstation. This module can be run at anytime by the network administrator to update the NMS map. The administrator then has access to the functions provided by the system according to the present invention through the NMS map. When the modified icon is accessed, icons are displayed for each of the administrator functions available through the present invention, such as the monitor and manager user interface.

The system according to the present invention includes an agent 14 which communicates with each of the components of the workstation 10 shown in FIG. 1, as well as with the management console 1. The agent 14 may be a generic agent, capable of handling errors from many different programs, or a specific agent, designed to address the errors occurring in one specific program. One embodiment of a specific agent is described below.

It is also possible to have more than one generic or specific agent executing on a workstation, each generic agent designed for a particular operating systems, such as DOS™, WINDOWS™, or OS/2™, and each specific agent designed to handle a different program. That is, generally, only one generic agent can be active on a particular workstation. However, an exception to this occurs when multiple operating systems are being used. If the workstation runs both DOS™ and WINDOWS™ operating systems, both DOS™ and WINDOWS™ agents will be active on the same workstation. For workstations running OS/2™, DOS™ and WINDOWS™, it is possible to have three generic agents simultaneously for these three operating systems. However, in the latter situation, the OS/2™ agent and the DOS™ agent would not use the same communication protocol.

The agent 14 described in the present disclosure refers to a DOS™ agent as an exemplary embodiment. However, as discussed above, at least three different generic agents, DOS™, WINDOWS™, and/or OS/2™ may be used. While explaining all interrupts and services, the present disclosure refers to DOS™, since only in that environment do all these things exists. However, since WINDOWS™ operating systems heavily depend on DOS™ for most of their services, the same DOS™ agent can detect, for example, "ACCESS DENIED" or "FILE NOT FOUND" problems within WINDOWS™ applications as well. The WINDOWS™ agent complements the DOS™ agent for those functions which the DOS™ agent cannot perform. These functions include: determining WINDOWS™ applications' names and supplying them to the DOS™ agent, performing starts and stops of WINDOWS™ applications, monitoring critical WINDOWS™ resource utilization, and monitoring general protection traps of WINDOWS™ applications. A WINDOWS™ agent supplies all this information for the DOS™ agent. The OS/2™ agent differs from the DOS™ and WINDOWS™ agents in that it intercepts system or communication dynamic link libraries (DLLs) instead of intercepting vital interrupts. Generally, however, the configuration of the three generic agents is the same. According to one embodiment, the different generic agents can use a predefined interrupt, e.g. the F2h interrupt, for internal communication between themselves.

The agent 14 monitors the applications and the operating system and when an interrupt is generated, hooks or traps that interrupt and determines if there is an error condition. If so, the error is recorded as an alert which is reported to the monitor 2. The alert is sent by the agent to the monitor 2 and includes identification of the type of problem, the workstation on which it occurred, the name of the program which caused the error, and a recommended corrective action. This recommended action can be modified by the administrator before it is executed.

A list of interrupts which are trapped according to one embodiment of the present invention is shown in Table 1.

TABLE 1

| INTERRUPT | ACTION |
| --- | --- |
| Int 2Fh | multiplexor for DOS ™ and WINDOWS ™ |
| Int 13h | hard disk handler |
| Int 21h | DOS ™ and WINDOWS ™ operating system service calls |
| Int NOVELL ™ 21h | NOVELL ™ DOS ™ shell services |
| Int 24h | critical error handler |
| Int 5Ch | NetBIOS ™ communication services |
| Int 17h | printer interface |
| Int 7Bh | NOVELL ™ Btrieve services |
| Int 08h | timer handler |
| Int 28h | idle handler |
| Int 09h | keyboard |
| Int 16h | keyboard buffer interface |

TABLE 1-continued

| INTERRUPT | ACTION |
| --- | --- |
| Any IPX ™/SPX ™ call NOS and Communication DLL of OS/2 ™ | IPX interrupt from NOVELL ™ |

Generally, the monitor 2 logs and reports all alerts coming from the agents 14 and the manager 4 monitors and controls the operation of the agents 14 on each of the workstations 10. Further, the monitor 2 may communicate a request for an operation to the manager 4 when specific alerts are reported by any of the workstations 10. Monitor 2 may also communicate a request to the manager 4 for an action to be taken on the agent 14 when the schedule 9 indicates that a specific time has arrived for performing a procedure. The manager 4 communicates with the controlled (or managed) workstation 10, and particularly, with the agent 14 via set or get operations. Set operations involve commands that are sent from the manager 4 to the agent 14 to perform some operation on the workstation and get operations involve commands or procedures that are sent from the manager 4 to the agent 14 to request that information be sent back to the manager. These will be discussed more fully below.

Figure 4:
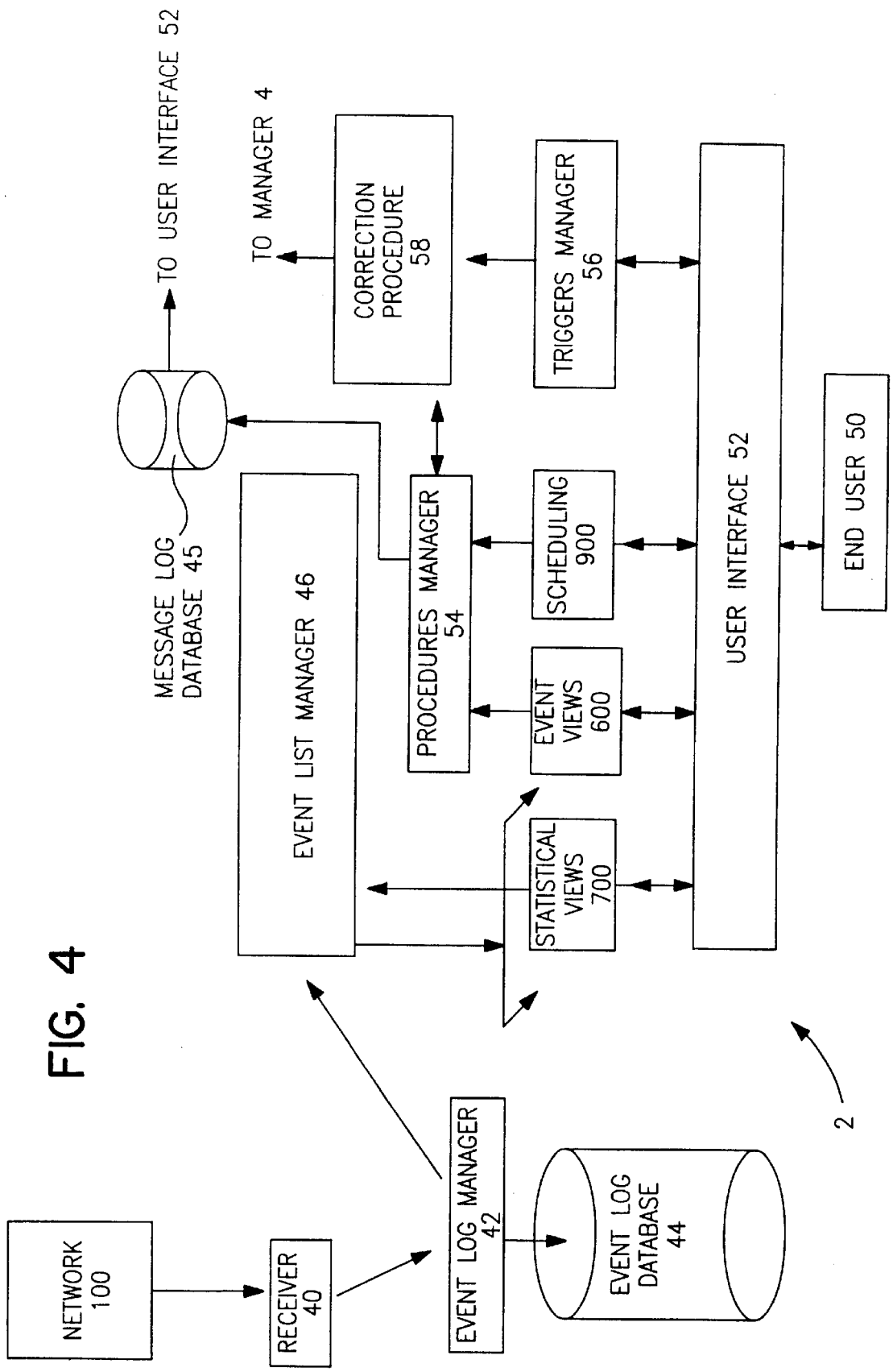
FIG. 4 is a block diagram of the monitor used in the system of FIG. 1 in accordance with an embodiment of the present invention.

According to one embodiment, the network administrator has the ability to set up the management console 1 to view subsets of the available information at a given time via a user interface 52 (shown in FIG. 4). In particular, the administrator can set up one or more event views 6 which display different alerts from certain or all workstations in the network. For example, one possible view may show all alerts occurring in any WORDPERFECT™ application running on any of the workstations. In addition, the administrator can set up one or more statistical views 7 which display information on network statistics. In particular, statistical views 7 display information about program fault or alert statistics, such as how many times a program was started, how many different type events happened in the program (for example, how many time "Too many files open" occurred during particular programs or on particular workstations), etc.

The administrator can also attach one or more triggers 8 to any of the views in the form of correction procedures. In particular, triggers are specific commands sent to the manager 4 from the monitor 2, and then to the agents 14, to cause actions to be taken, generally by the agents. For example, if a problem is detected with a WORDPERFECT™ application, the system accesses the appropriate view and sends a freeze workstation trigger to the workstation running the failed application.

The triggers 8 represent stored triggers which, according to one embodiment, are stored in a module called a trigger library (which is in effect a WINDOWS™ DLL). One trigger library may contain more than one trigger. Several trigger libraries may be provided with the system for different purposes. One trigger is the function (or command) which is stored in a trigger library and can be called by the monitor 2 to be executed automatically as part of a procedure. The triggers can be called automatically in two cases, either in a correction procedure executed in response to an alert or in a scheduled procedure executed at a desired time as set up by the scheduling module 900.

Table 2 is a list of predefined triggers which can be included in procedures according to one embodiment of the present invention. The numbers in the first column of Table 2 are for purposes of this description only and have no programming significance.

The predefined triggers can be stored in a trigger library module as described above, which is stored in memory, for example, on the hard disk 408 or ROM 410. The network administrator can also set up and design custom triggers by choosing a setup trigger option from the monitor menu user interface 52. These custom triggers can be commands to execute available programs, such as NORTON™ Utilities. Alternatively, the administrator can use a software developer's kit to create a new custom trigger by writing a new program to execute the desired functions.

TABLE 2

LIST OF TRIGGERS TO BE SENT TO AGENT

| | |
|---|---|
| 1 | change files in CONFIG.SYS |
| 2 | add line to AUTOEXEC.BAT |
| 3 | install driver |
| 4 | check disk |
| 5 | send message |
| 6 | send keystroke job |
| 7 | start program |
| 8 | stop program |
| 9 | send SNMP trap |
| 10 | send alert via modem/cc:mail/pager |
| 11 | freeze workstation |
| 12 | reboot workstation |
| 13 | run program on local workstation |
| 14 | unfreeze workstation |
| 15 | generate nms alarm |
| 16 | copy files |
| 17 | set last drive |
| 18 | set disk buffers |

Table 3 is a list of additional triggers available according to another embodiment of the present invention. Again, the numbers in the first column in Table 3 are for purposes of the description only and have no programming significance.

TABLE 3

LIST OF TRIGGERS TO BE SENT TO AGENT

| | |
|---|---|
| 19 | stop program by name |
| 20 | pause |
| 21 | stop failed program |
| 22 | set number of NCB |
| 23 | copy alert to database, text or printer file |

The lists in Tables 2 and 3, which will be discussed together for simplicity, are lists of possible triggers that can be included in the correction procedures or in scheduled procedures. These lists are not meant to be exhaustive but are exemplary of the types of operations that could be performed. The implementation of other triggers is within the skill of the ordinary artisan once in possession of the present disclosure.

Trigger 1 causes the manager 4 to notify the agent 14 to change the specified number of files in the CONFIG.SYS file. This trigger would be implemented if the agent generated an alert that indicated that the program required more files open than previously specified, for example, in response to detection of an error code from Interrupt 21h. Trigger 2 causes the manager 4 to notify the agent 14 to modify the AUTOEXEC.BAT file as necessary to correct the problem that led to the generation of the alert. Trigger 3 causes the manager 4 to notify the agent 14 to install a driver into the startup procedure at the workstation at which the alert was generated. For example, if a printer or a mouse driver is missing and is needed by a particular program, a trigger would be executed to install the missing driver. Trigger 4 causes the manager 4 to notify the agent 14 to check the disk for bad sectors or spots, either at scheduled times or when a serious disk error is reported.

Trigger 5 allows the manager 4 to send messages to any of the workstations in the network. Trigger 6 causes the manager 4 to send a keystroke job, that is, a sequence of keystrokes for execution, to the agent 14 on a particular workstation. Triggers 7 and 8 cause the manager 4 to notify the agent 14 to start a program or stop the program currently executing in the foreground.

Trigger 19 causes the manager 4 to notify the agent 14 to stop a particular program by name. This trigger is useful for stopping programs executing in the background operations of the workstation. Trigger 21 causes the manager 4 to notify the agent 14 to stop the program that has failed, that is, the program that was executing when the alert was generated.

Trigger 9 allows the manager to send a simple network management protocol (SNMP) trap. That is, if the network has a SNMP management console, a trap or alert is sent to that console notifying it of the error. Trigger 10 allows the manager to forward an alert via another electronic medium, providing problem notification to locations not connected to the network. Trigger 11 freezes the workstation to prevent further problems, until the problem which caused the alert is fixed. Trigger 14 would then be used to unfreeze the workstation when the problem had been corrected.

Trigger 12 causes the manager 4 to notify the agent 14 to reboot the workstation as necessary. For example, if the AUTOEXEC.BAT or CONFIG.SYS files had been altered by triggers 1 and 2, the reboot trigger would be executed to allow the changes to take effect. Trigger 13 causes the manager 4 to notify the agent 14 to run a particular program on the workstation, supporting such actions as custom notification via audio or visual alarms. Trigger 15 allows the manager 4 to generate a NOVELL™ management system (NMS) alarm, to notify the NOVELL™ management system that an alert has occurred on a workstation.

Trigger 16 causes the manager 4 to notify the agent 14 to copy files to the workstation which generated an alert as necessary to correct the problem, for example, to transfer device drives, program modules or data files to the workstations. Trigger 17 causes the manager 4 to notify the agent 14 to set the last drive in CONFIG.SYS. Trigger 18 causes the manager 4 to notify the agent 14 to set the number of disk buffers in CONFIG.SYS.

Trigger 20 causes the manager 4 to pause a procedure for a period of time. This could be used to wait until the workstation has completed a portion of a procedure. Trigger 22 causes the manager 4 to notify the agent 14 to set the number of network control blocks (NCB) in CONFIG.SYS. This would be used in response to a problem with NetBIOS™, and particularly, interrupt 5Ch. Trigger 23 allows the alert to be copied to a database, text or printer file for review or storage.

Returning to FIG. 1, automatic procedures 5 may be set up by the network administrator which consist of a set of triggers, with specified parameters, chosen from one or more trigger libraries. The procedures each consist of one or more triggers which triggers are executed in sequence in response to an event or at scheduled times. Accordingly, such procedures can be attached to either event views 6 or to the schedule 9. In the first case, the procedures are referred to as correction procedures. In the second case, the procedures are referred to as scheduled procedures. Of course, the same procedure may be used both as a correction procedure and a scheduled procedure.

The triggers in the procedures may either be one of the triggers listed in Tables 2 and 3 with their associated parameters, or they may be custom triggers. For example, "change FILES in CONFIG.SYS" supplied with parameter 50 becomes a command to set FILES=50 in the CONFIG.SYS file. In this way, Tables 2 and 3 list commands for building procedures.

In any case, the monitor 2 automatically and sequentially calls the triggers according to the procedure in which they are contained. According to one embodiment, the procedures execute in the background on the workstations so that they are not visible to the user of the workstation. The monitor 2 calls all the triggers from a correction procedure at the time when a new alert arrives at the event view with which the correction procedure is associated. The monitor 2 call triggers from a scheduled procedure when the time interval specified in the scheduled procedure has passed.

A schedule 9 can be set up by the administrator to schedule procedures to be run on any of the workstations at desired times. For example, the check disk procedure 4, backups and database maintenance functions can be run at scheduled times during the week or month, and/or automatic workstation logoff after a set amount of time can be provided.

Figure 3:
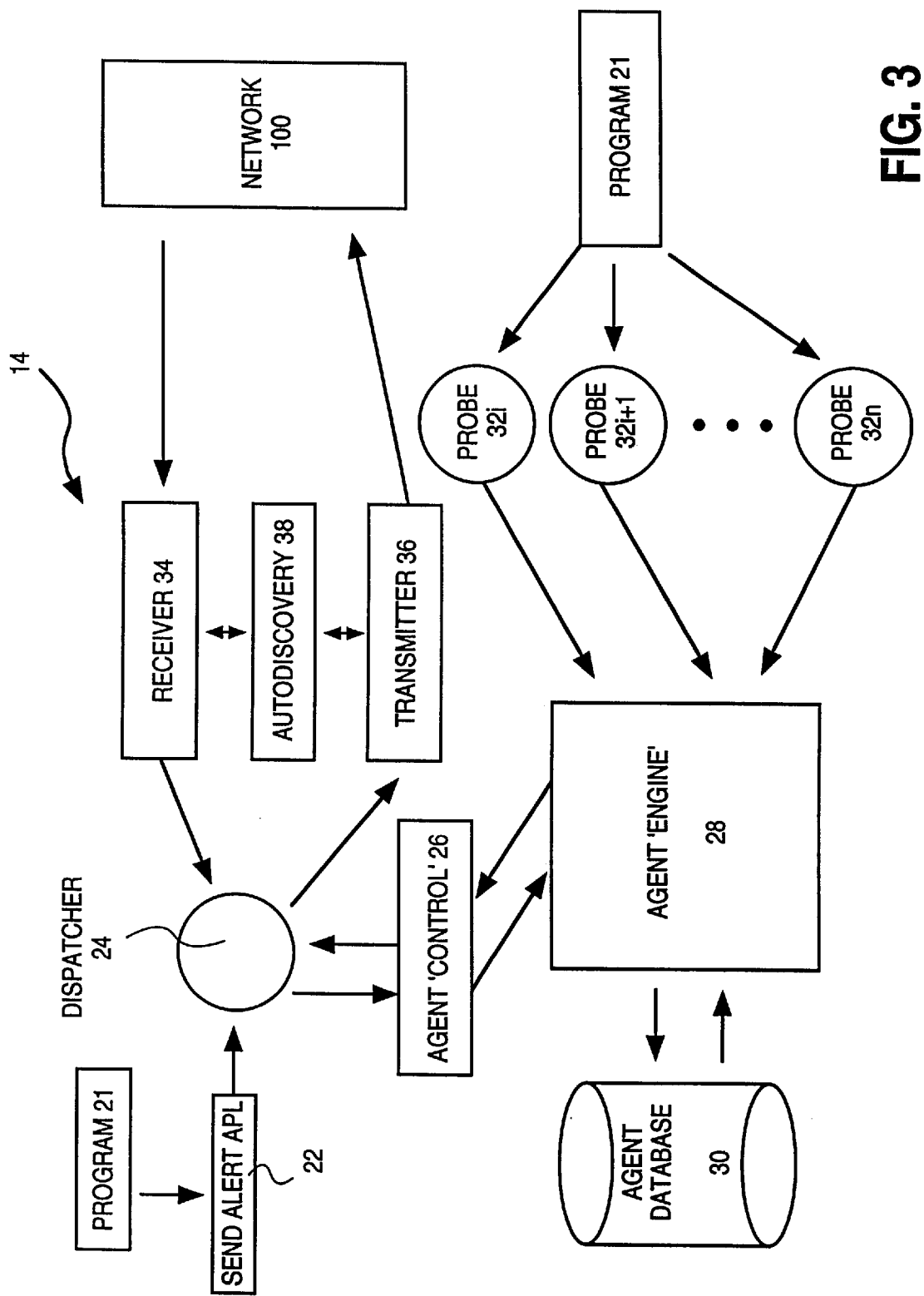
FIG. 3 is a block diagram of the generic agent used in the system of FIG. 1 in accordance with an embodiment of the present invention.

FIG. 3 is a block diagram of a generic agent 14 according to one embodiment of the present invention. The program 21 module includes all functional blocks in the workstation, except the agents; in particular, the end user application 12, the operation system 16, the communication software 18 and the network operation system 18 shown in FIG. 1. There are two ways that the program 21 may communicate with generic agent 14: via the application programmer interface (API) or via the probe modules $32_n$. The program 21 may communicate with the agent 14 via a module 22 which sends an alert to a dispatcher 24 via the API when an error condition occurs. The program 21 is also connected to each of the probe modules $32_i$, $32_{i+1}$ . . . $32_n$, the function of which will be described below.

The dispatcher 24 is a decision making procedure that decides which function to execute in the agent based on the communication received from API module 22, receiver module 34, or agent "control" module 26. The dispatcher 24 sends a command to the agent control module 26 once the decision is made. The agent control module 26 controls the operations of the agent through the agent engine module 28. In particular, the generic agent 14 may be instructed by the triggers to perform actions on the operating system or the workstation, such as start program, change file, freeze keyboard, display message, etc. The agent control module 26 performs these functions on the workstation. The probe modules $32_i$, $32_{i+1}$ . . . $32_n$ are used to hook the interrupts. There is a probe module $32_i$ for every interrupt handled by the system. The agent engine module 28 performs the processing of events received from the probe modules $32_i$ and directs actual alerts via the agent control module 26 to the monitor 2 through the network 100.

When program 21 accesses the agent 14 via the "send alert API" module 22, the program 21 actually creates and sends a specific application alert. In particular, the generic agent 14 detects generic errors which can happen to any program. The agent also provides an API (send alert API) which allows any program to create specific alerts and send them via the agent 14 to the monitor 2. For example, the WORDPERFECT™ application could use this API to send an alert concerning a "Paragraph formatting error". The agent 14 transmits this alert to the network, and further to monitor 2 for processing by the system. This case is described above. However, it is also possible for the user programs to access the generic agent 14 indirectly via the probes $32_n$. When the program calls the operating system or any other system services, the probes $32_n$ of the agent 14 get control. This processing is discussed below with respect to FIG. 7.

The receiver module 34 and the transmitter module 36 are used by the agent 14 for communicating with the network 100. The receiver module 34 and transmitter module 36 interface with the communication software of the network card. According to one embodiment, the receiver module and transmitter module can communicate using any one of four network communication protocols: IPX™, NetBIOS™, DLC™ 802.2, and TCP/IP™. It is within the skill of the ordinary artisan to provide the capability for communication using other protocols, either protocols known today or developed in the future.

An agent automatic discovery (autodiscovery) module 38 communicates with the transmitter 36 and the receiver 34 to facilitate the automatic discovery of newly activated agents 14 by the manager 4, eliminating the need for the network administrator to perform the tedious process of manually defining each user. The autodiscovery module 38 sends to the manager 4 an identification packet of the newly activated agent to be discovered by the manager 4. This transmission occurs at the time the new agent is activated and at predetermined intervals thereafter until the autodiscovery module 38 receives confirmation from the manager 4 that the newly activated agent is discovered. According to one embodiment, the predetermined interval is about 60 seconds.

FIG. 4 is a block diagram of the monitor 2 according to one embodiment of the present invention. The monitor 2 communicates with the generic and specific agents on the individual workstations through the network 100. Information is received from the network 100 through a receiver 40. According to one embodiment, the receiver 40 has the capability noted above with respect to receiver 34. In particular, the receiver allows communication using any one of four of network communication protocols. Of course, the receiver 40 could alternatively be provided to only allow communication using one of the protocols. The receiver 40 transmits the alerts received from the network 100 to an event log manager module 42. All of the alerts received from the monitor 2 are stored in the event log database 44 by the event log manager module 42. The event log manager module 42 can export data into DBASE™ format or several other database formats.

According to one embodiment of the present invention, the event log database 44 consists of two files, an event details file and an event index file, shown in Tables 4 and 6, respectively. Table 5 shows the alert details structure. The event details file contains variable length records, while the event index file contains fixed length records.

TABLE 4

| SIZE | FIELD NAME |
|---|---|
| word | alert_ord |
| evnidx | alert_idx |
| byte | alert_det[maxdetail] |

TABLE 5

| 2b | detail length | 2b |
|---|---|---|
| detail length + 4 | alert SNA subvectors | detail length + 4 |

TABLE 6

| SIZE | FIELD NAME |
|---|---|
| byte | ri_type |
| byte | ri_reserv |
| long integer | ri_det_off |
| word | ri_det_len |
| word | ri_idx |
| word | ri_idxid |
| byte | ri_gtype |
| byte | ri_time[3] |
| byte | ri_date[3] |
| byte | ri_adapter[macaddr_size] |
| word | ri_segment |
| byte | ri_proname[proname_size] |
| byte | ri_resname[resname_size] |
| byte | ri_restype |

In Table 4, the alert_ord field, consisting of one byte, stores an alert ordinal number which is unique for each alert. The alert_idx field contains the alert key fields of Table 6 having a size evnidx equal to the size of the event index record. The alert_det field, having a field size of maxdetail, contains the alert details, in the layout shown in Table 5. In particular, the first and last 2 bytes contain the detail length plus four bytes, and the middle "detail length" bytes consist of the alert SNA subvectors. The SNA subvectors refer to the SNA network management vector transport (NMVT) system used by IBM for alerts within networks.

In Table 6, the ri_type field is the record type field for identifying the record type. In particular, according to one embodiment of the present invention, most of the records in this database are events that are reported by the agents. Some of the records are generated by the monitor. An example of this latter type of event is congestion in the network. Which of these types of records is identified by the record type field. The ri_reserv field is reserved for future use. The ri_det_off field is the detail record offset, that is, the location within the event details file. The ri_det_len field is the detail record length.

The ri_idx is a hexadecimal number assigned to each alert representing the textual description which is used to identify the alert. All of the ri_idx values for each possible alert are stored in a separate database which database is indexed by the ri_idxid value. The ri_idxid value is thus the index number which refers to the particular alert entry in the index database which is part of the user database 74 (in FIG. 5).

The ri_gtype field contains the type of event, which is used for filtering the reported alerts. The ri_time and ri_date fields indicate the time and date at which the event causing the alert occurred. The ri_adapter field contains the adapter number representing the actual address of the workstation from which the alert was generated. The ri_segment field is the segment number indicating the segment of the network in which the workstation is located. The ri_proname field indicates the product name of the program which caused the alert. The ri_resname field is the user name of the workstation corresponding to the adaptor number. The ri_restype field indicates the name of the resource being used when the alert was generated, for example, the printer or other system component.

A message log database 45 is provided which is maintained by the procedures manager 54, described below. The message log database 45 includes the outcome of triggers, that is counters of events, triggers, and the like to show the size of the databases and support the operation of the modules. The contents of the message log database 45 is displayed to the administrator through the user interface 52.

The statistical views module 700 is accessed by the end user 50 through the user interface 52 to create, modify, delete and access the desired statistical views 7. The event views module 600 is accessed through the user interface 52 to create, modify, delete and access the desired event views 6. Additionally, the scheduling module 900 is accessed through the user interface 52 to create, modify, delete, and access the scheduled procedures to be sent to the agent by the manager 4 to be executed on the workstation at desired times.

The event log manager module 42 communicates each alert to an event list manager module 46. This module 46 reads each new event and displays it on the display at the computer on which the management console 1 resides within one of the views set up by the administrator, after the module 46 filters out those events or alerts which are not requested in the selected statistical view 7 or event view 6.

The triggers manager module 56 allows the administrator to manage, including create, modify, and delete, custom triggers. The correction procedures module 58 allows the administrator to create the procedures, including, as described above, one or more of the triggers, either predefined or custom triggers.

The procedures manager module 54 takes the output from the event views module 600 and the scheduling module 900 and chooses one or more of the procedures to be sent to the manager 4 that are associated with a schedule or selected event views in response to an alert. In particular, the procedures manager module 54 picks up a correction procedure assigned to the view assigned to the alert that was reported and sends that correction procedure to the manager 4 for execution. Of course, it possible that one alert is assigned to more than one view and more than one correction procedure is assigned to any view. In addition, the procedures manager 54 picks up a scheduled procedure at the scheduled times and sends it to the manager 4 for execution.

Figure 5:
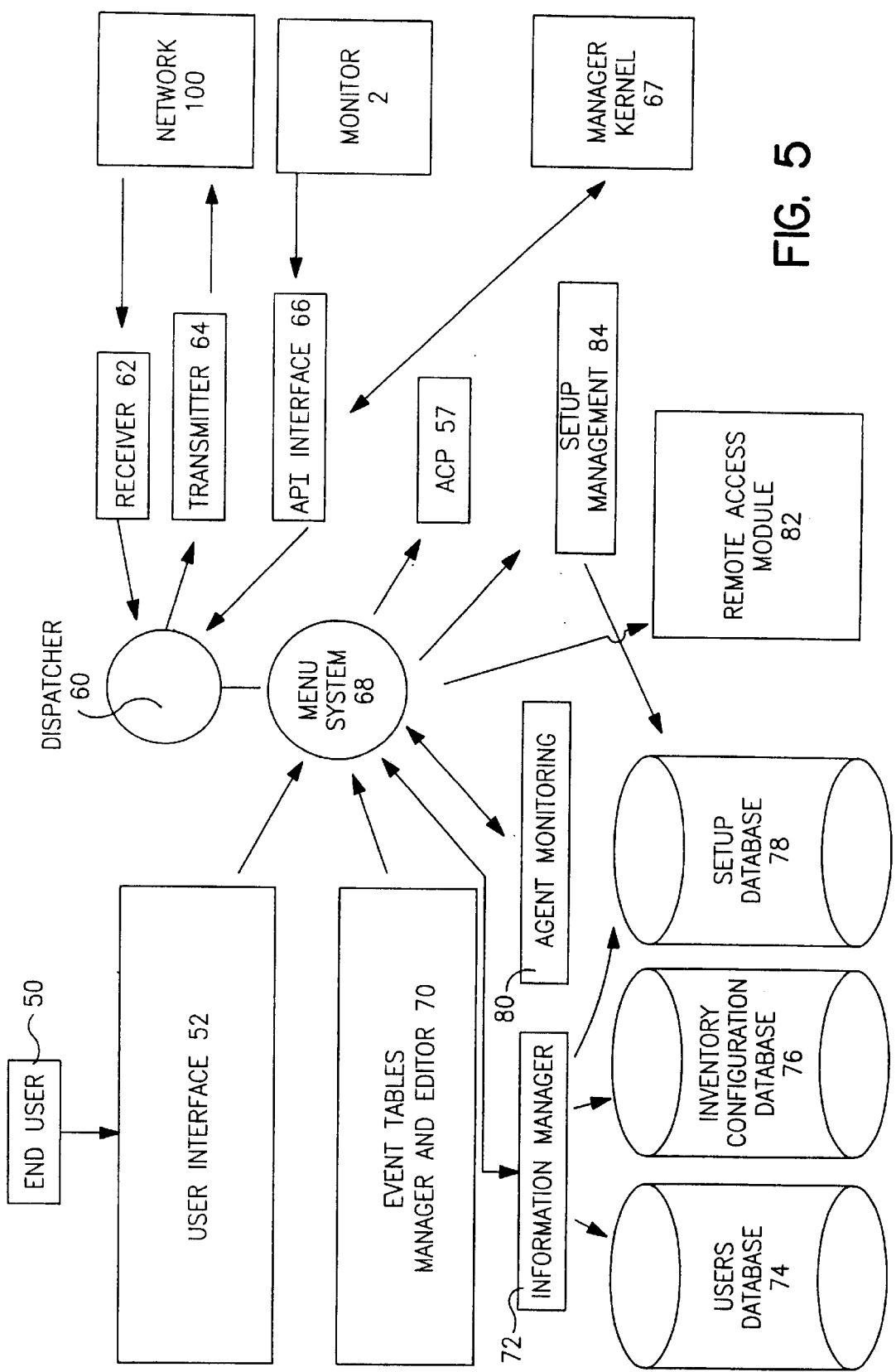
FIG. 5 is a block diagram of the manager used in the system of FIG. 1 in accordance with an embodiment of the present invention.

FIG. 5 is a block diagram of the manager 4 according to one embodiment of the present invention. The network 100 communicates with the manager 4 through a receiver 62 and a transmitter 64 of the type described above with respect to receiver 34 and transmitter 36 shown in FIG. 3 for use with agents 14. The receiver 62 and transmitter 64 communicate with the dispatcher 60. The dispatcher 60 is one of the same type as described above with respect to the dispatcher 24 shown in FIG. 3. The monitor 2 and the manager kernel 67 communicate with the dispatcher 60 through an API interface 66. The manager kernel 67 performs the triggers set up in the correction procedures upon the occurrence of a triggering event and performs the scheduled procedures at the desired times. This will be described below with respect to FIG. 11.

The end user 50 communicates with the manager 4 through the user interface 52. The dispatcher 60 communicates with the menu system 68. The user interface 52 also communicates with the menu system 68 through which the administrator selects the functions to be performed. The menu system 68 allows access to the event tables manager and editor 70, the information manager 72, the agent monitoring module 80, the remote access module 82, and the setup management module 84.

The event tables manager and editor 70 allows the administrator to edit and/or manage the event tables. Event tables are specifications of events to be reported. These tables specify various control functions, most importantly the masking specification to determine which events are to be reported over the network. The information manager 72 allows the administrator to have access to any of a number of databases 74, 76, and 78. The users database 74 stores information regarding the agents, that is, the setup of the agents on the workstations. In particular, the users database 74 stores the login names, and addresses, masks and agent control parameters. The user database also stores the index definitions which is indexed by an index number for each alert as described above. The inventory configuration database 76 stores information relating to the configuration of each workstation. In particular, the information consists of things such as the type of machine, the processor type, the memory size, etc. The setup database 78 stores the customized setup configuration for the manager 4. In particular, the setup database 78 stores a collection of common parameters for the manager 4 such as locations of database files, the set of event tables with which to work, fonts used for text, etc.

Also connected to the menu system 68 is the application control module (ACP) 57. The ACP 57 allows the administrator to view all the programs, device drivers and TSRs currently loaded in a remote workstation. Further, the ACP 57 starts and stops programs in the background operation of the user application executing in the remote workstation. In particular, if a program is executing on a remote workstation, the ACP 57 can launch and execute capture of the workstation in the background without stopping or pausing execution of the program executing in a foreground operation of the workstation. Using the ACP 57, the administrator can view or update any configuration file on the remote workstation without disturbing the end user by taking control of his workstation, by performing the update/view functions in the background.

This is accomplished slightly differently in DOS™, WINDOWS™ or OS/2™. In DOS™, because it is not a multi-task operating system, the ACP 57 uses the undocumented backdoor feature. In particular, the ACP 57 gains access to DOS™ through a handle known as the backdoor, launches the background application for making the changes, and closes the backdoor and returns control to the foreground application. In WINDOWS™, a second task is started in the background and the focus of the new task is set to allow it to coexist with the foreground application. In OS/2™, the procedure is the same, but the task is referred to as a process.

The agent monitoring module 80 performs the monitoring of the behavior of the agents on the workstations in the network. The agent monitoring module 80 works in conjunction with the autodiscovery module 38 to detect users signing onto the network and maintains information about active agents for the manager 4 and also identifies undefined active agents (autodiscovery). The remote access module 82 allows the management console to have remote access to each of the workstations, that is, the management console becomes the "master" over the individual workstations. In this way, the administrator can take direct control of the operations on each workstation. In particular, the remote access module 82 takes direct control over the screen, keyboard, and mouse of each of the workstations in a known manner. The setup management module 84 controls the setup of the manager and is thus connected to the setup database 78.

Figure 6:
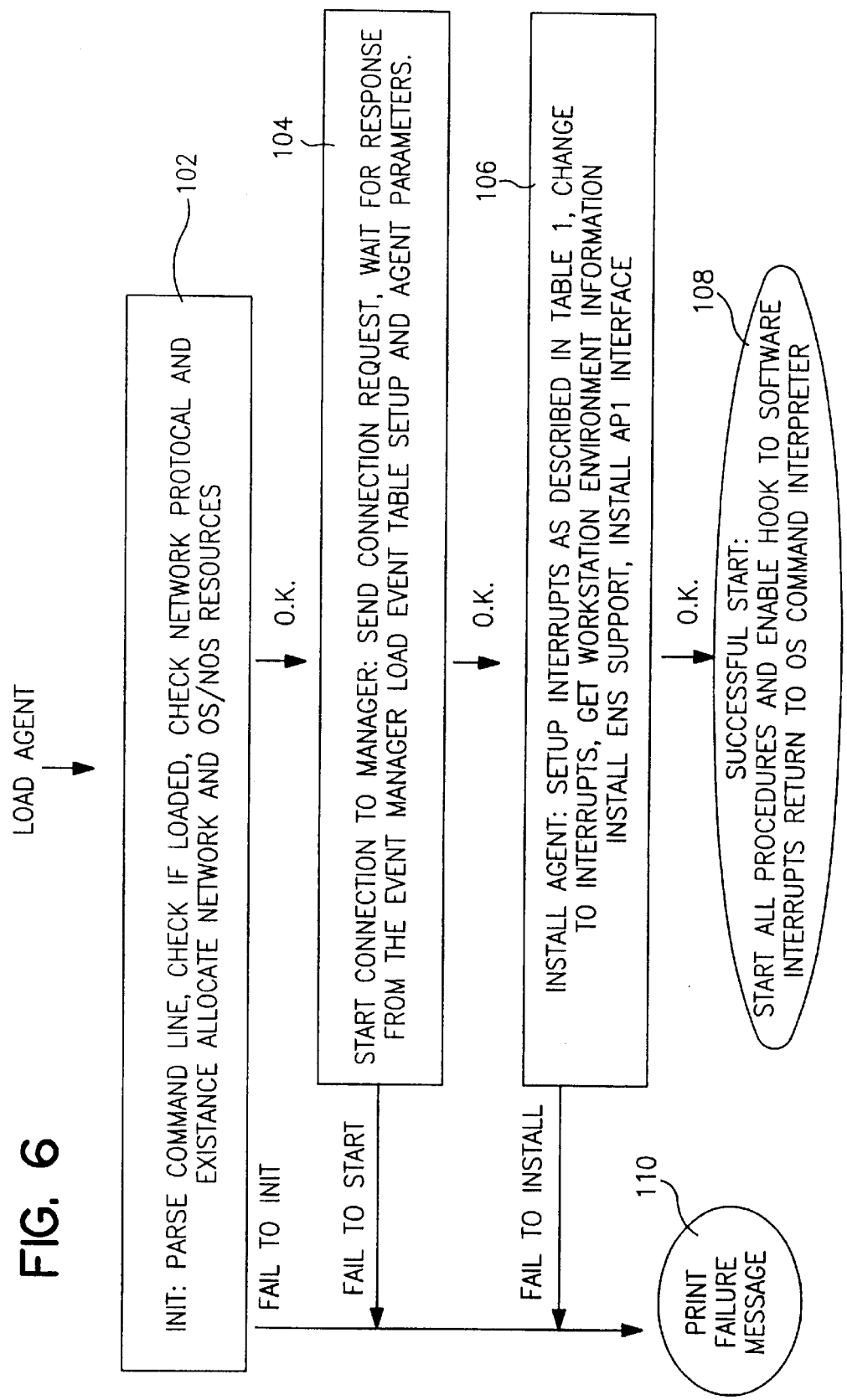
FIG. 6 is a flow diagram of a routine for the initialization phase of the generic agent used in the system of FIG. 1 in accordance with an embodiment of the present invention.

FIG. 6 is a flow diagram of a routine performing the initial phases of the generic agent program according to one embodiment of the present invention. This routine is executed whenever the agent is started on the workstation. First the generic agent is loaded as a TSR program (Load Agent).

At step 102, the initialization is begun. The command line is parsed and the routine checks whether the agent is loaded. In addition, the routine checks the existence of the network and the network protocol and the network and OS/NOS resources are allocated as necessary.

The programs according to the present invention, on a NOVELL™ network, are automatically installed on the file server through the file server login script. Accordingly, the NOVELL™ networks, there is no need to install the programs in the hard drive on every workstation. When the user logs in to his/her workstation, the programs according to the present invention are automatically downloaded on the workstation. Conventionally, the NOVELL™ login script allows a batch file to be executed on the workstation when the user logs in, but a terminate-and-stay-resident (TSR) program cannot be executed because NOVELL™ logic automatically clears memory upon termination. The installation program according to the present invention includes a "load tsr" module which is executed in the login script which puts a stamp of which TSR should be loaded in a protected area of memory which is not touched by the NOVELL™ terminate login. Then, when the login script terminates, the installation program takes control from DOS, accesses the protected area and takes the TSR and its parameters and loads them in the clean memory.

If the initialization at step 102 is successful, the connection to the manager is started at step 104. A connection request is sent. The agent waits for a response from the manager and then loads the event table setup and agent parameters. The event table setup and agent parameters are downloaded from the users database 74 to the memory resident agent database 30. The event table setup includes the specifications of filters that control reporting of events over the network. The agent parameters include status and control information about the agent other than filter setup, e.g., frozen/unfrozen status of the workstation.

If this operation is successful, the agent is installed at set 106. In particular, the interrupts described in Table 1 are set up and the agent replaces the interrupts listed in Table 1 for the interrupts normally present on the workstation. In this way, whenever a program calls an interrupt corresponding to one on the list in Table 1, the agent takes control, in other words, hooks or traps the interrupt, and executes the substituted instructions. The return code is verified and, if the interrupt operation is not successful, an alert is sent to the monitor 2 with a report of the failure. At step 106, the agent also obtains the workstation environment information, installs extended memory system (EMS) support, and installs the API interface.

If the installation of the agent is successful at step 106, a successful start has occurred at step 108. All procedures are started and hooks to software interrupts are enabled. Finally, a return is made to the OS command interpreter.

If any one of the operations at steps 102, 104 and 106 fails, a failure message is printed at step 110. In particular, if step 102 fails, a "fail to initialize" message is sent. If step 104 fails, a "fail to start" message is sent. Finally, if step 106 fails, a "fail to install" message is sent.

Figure 7:
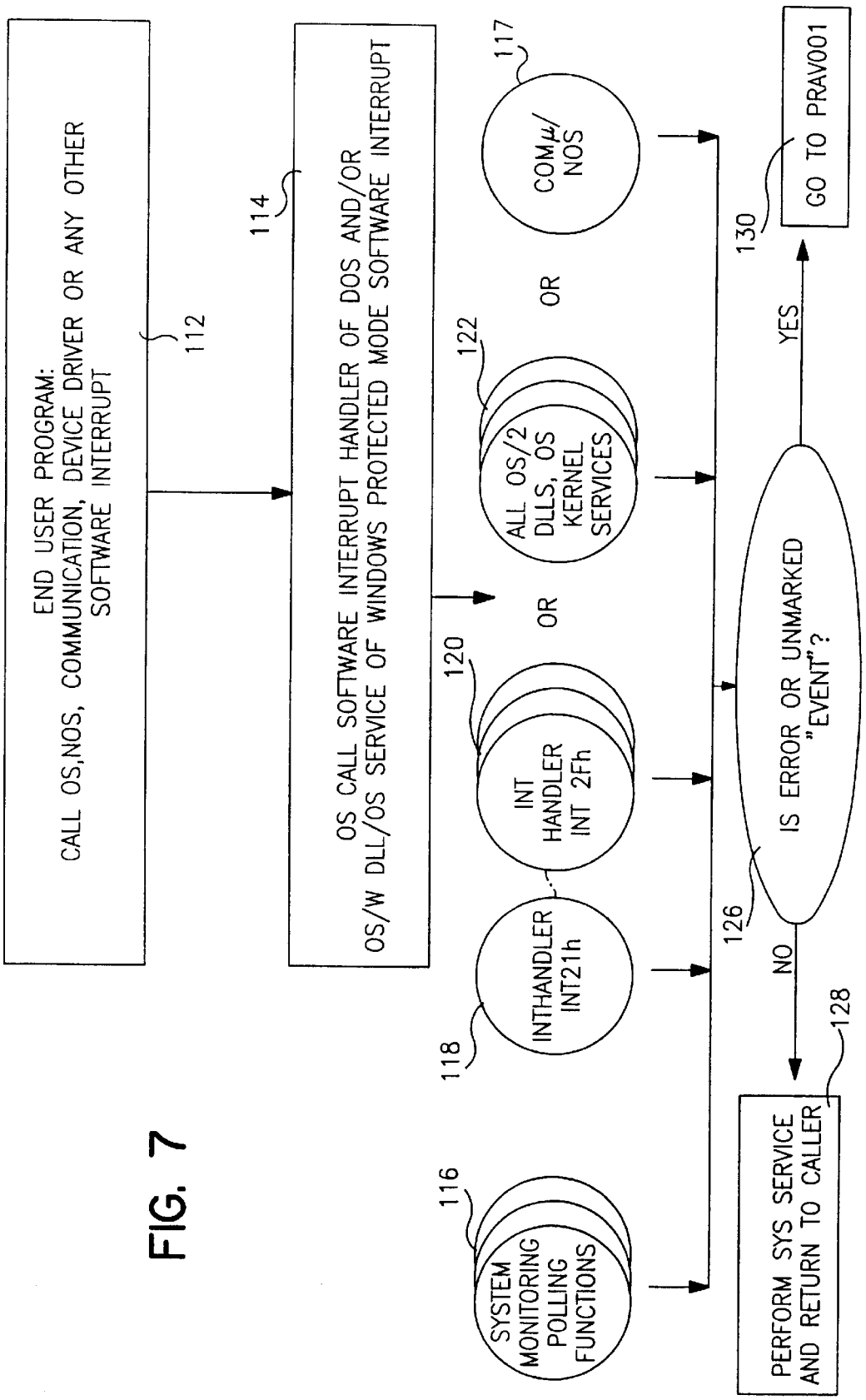
FIG. 7 is a flow diagram of a routine for the operation phase of the generic agent used in the system of FIG. 1 in accordance with an embodiment of the present invention.

FIG. 7 is a flow diagram of a routine for the operation phase of the generic agent program according to one embodiment of the present invention. At step 112, if it is detected that the end user program calls OS, NOS, communications, a device driver or any other software interrupt, the operation of the agent begins. At step 114, an OS call to the software interrupt handler of DOS™ and/or OS/2™ DLL/OS service or WINDOWS™ protected mode is executed.

Entry points 116, 117, 118, 120, and 122 illustrate possible options for the events that may occur which would cause the agent to determine whether an error or unmasked event has occurred at step 126. Entry point 116 represent the system monitoring and polling functions performed by the generic agent. Entry point 117 represents the interrupt from the communications and network operating systems (NOS) services. Entry point 118 represents the interrupt handler for interrupt 21h, the DOS™ and WINDOWS™ operating system service calls. Entry points 120 represent the interrupt handler for interrupt 2Fh, the multiplexor for DOS™ and WINDOWS™. A plurality of entry points 120 are provided to schematically illustrate that the execution of any one of the interrupts listed in Table 1 may trigger the generic agent to determine whether an error or unmasked event has occurred. Entry points 122 represent all OS/2™ DLL's, and OS kernel services.

If there is no error with any of these operations or if the event is a masked event, the operating SYSTEM SERVICE is performed and control is returned to the caller at step 128. If an error occurs during execution of one of the programs or functions identified in 116, 117, 118, 120, and 122, and if that error is an unmasked event at step 126, control passes to PRAV001 at step 130 (shown in FIG. 8).

The purpose of the test at step 126 is explained as follows. When the agent detects an error, that is, an event, the agent can decide whether to send a report and alert on the basis of whether the event is masked or filtered. In particular, certain events can be masked at the agent level to prohibit reporting of the event to the monitor. If the event is not masked at the agent level, the alert is sent to the monitor. In particular, the network administrator can set up filters in the manager to cause reporting of only certain events under certain conditions. This involves the creation of user database 74 discussed above with respect to FIG. 5.

Figure 8:
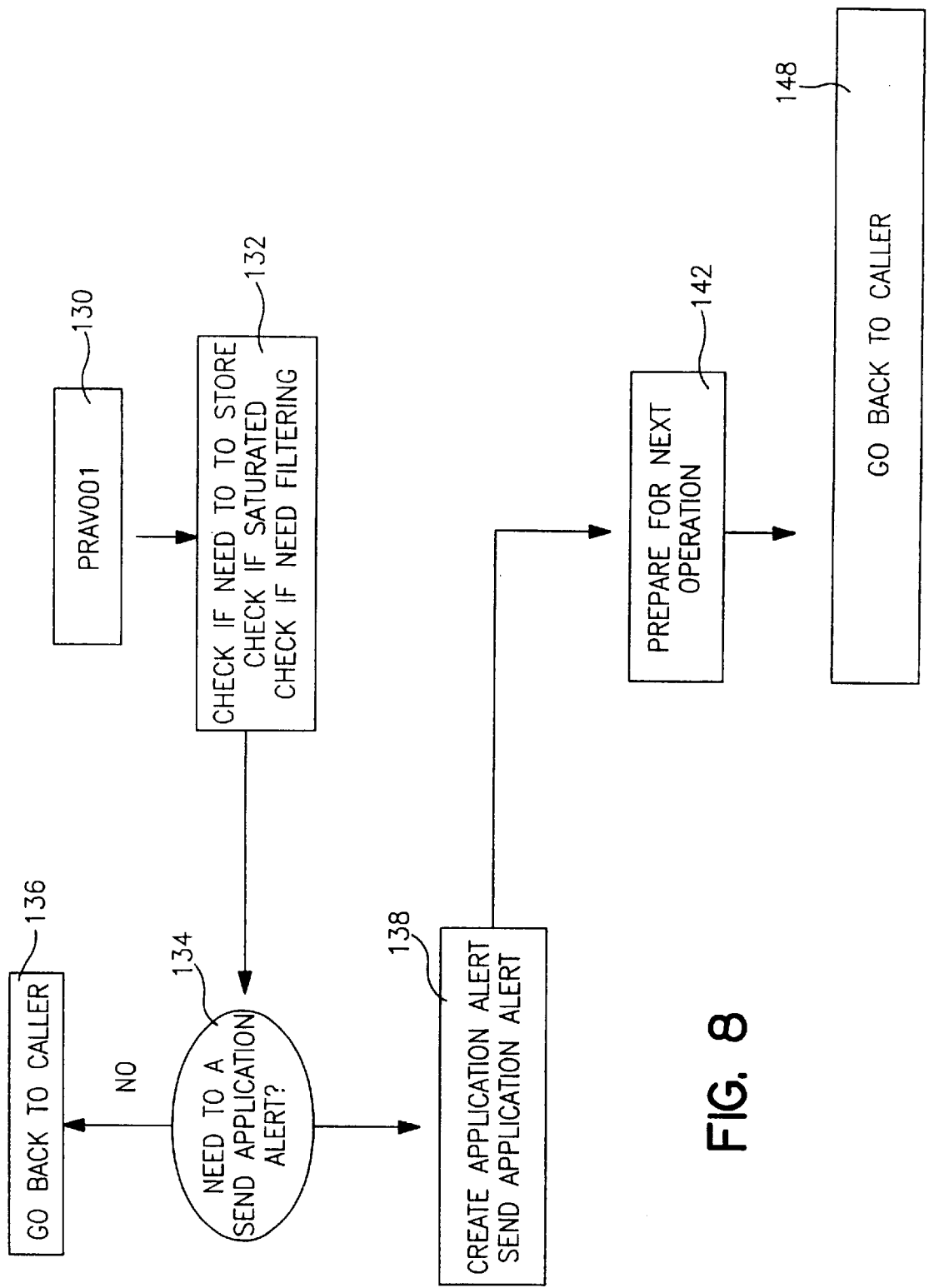
FIG. 8 is a flow diagram of a routine for the fault management phase of the generic agent used in the system of FIG. 1 in accordance with an embodiment of the present invention.

FIG. 8 is a flow diagram of a routine for the fault management phase of the generic agent according to one embodiment of the present invention. Step 130 is the PRAV001 routine entered from FIG. 7. First, at step 132, a determination is made whether the event alert is required to be stored. If the event alert is not to be stored, the routine returns to the caller. A determination is then made whether the event is saturated. In particular, when the generic agent generates alerts that are constantly repeating, to avoid overflow of the network, the agent will stop reporting an alert according to parameters defined in the event table. This saturation is communicated to the monitor so that it knows that the event is saturated and will not be reported further.

Finally, a determination is made whether the event is to be filtered. If the event is to be filtered, the event is not reported. In particular, it is possible to set up filters such that, for example, a particular event is reported only from specific programs. In this case, if the event has occurred from a non-specified program, the event would not be reported. A basic filtering for masked and unmasked events is done in step 126 in FIG. 7 as described above. At this step (step 132), the program or file name that generated the alert may optionally be compared to a names table set up in the user interface 52, stored in the users database 74, and downloaded to the agent database 30. If the program is not found in the names table, no alert is sent.

At step 134, it is determined from the results of the test at step 132, whether it is necessary to send an application alert to the monitor. If not, control is returned to the caller at step 136. If a determination is made at step 134 that an alert should be sent, the application alert is created and sent at step 138. Then the agent prepares for the next operation at step 142 by resetting itself to an initial condition able to accept a new interrupt. Control is then returned to the caller at step 148.

Figure 9:
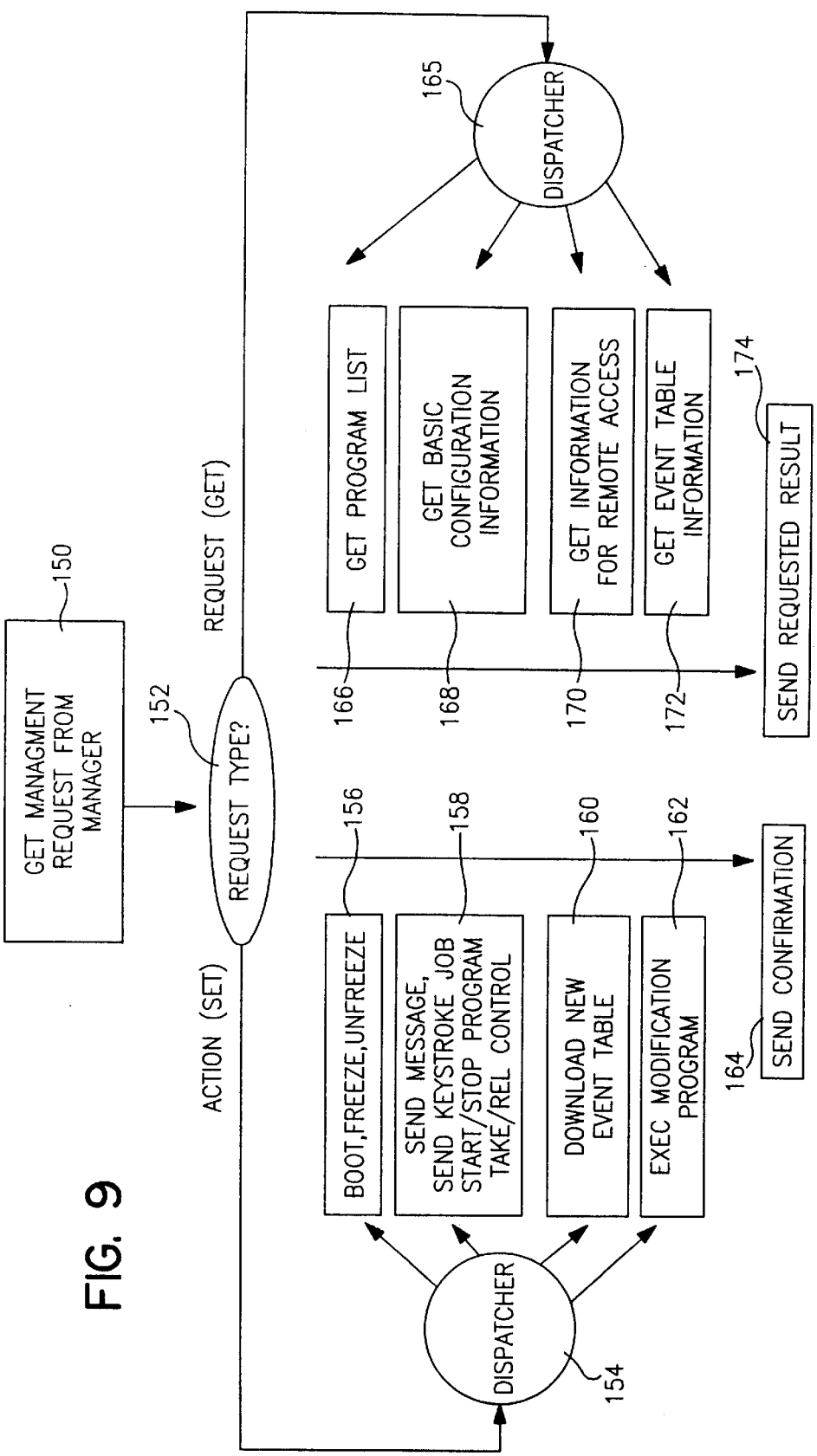
FIG. 9 is a flow diagram of a routine for the controlling and management phase of the generic agent used in the system of FIG. 1 in accordance with an embodiment of the present invention.

FIG. 9 is a flow diagram of a routine for the controlling and management phase of the generic agent. This phase is entered at step 150 when a management request is obtained from the manager 4. At step 152, it determination is made whether the type of the request is an action (set) or a request (get). If it is a set request, it is passed to the dispatcher 154 which determines which of the actions to execute. Boot, freeze or unfreeze set commands for the workstation are executed at step 156. Messages, keystroke jobs, start or stop program orders, or orders to take or release control of a workstation are executed at step 158. The manager 4 may also send a set request to the generic agent to download a new event table at step 160. Finally, the manager 4 can send an file modification request which is performed at step 162. This module executes the modification orders such as changing the CONFIG.SYS or AUTOEXEC.BAT files. After the actions in steps 156, 158, 160 and 162 are performed, confirmation is sent back to the manager 4 at step 164.

If a get request is detected at step 152, the get command is sent to the dispatcher 165 which performs one of the functions at steps 166, 168, 170 and 172. If the manager 4 has requested the program list, it is sent at step 166. This program list is the list of programs running on the workstation for the receiving agent at the time of receipt of the request. If basic configuration information is requested, this is sent at step 168. If information is desired for remote access, such as video driver, mouse, or operating system information, the information is gathered at step 170. Using information from this get order, the manager 4 can take control of the agent's workstation through a set request processed at step 158. If the manager requests event table information, it is retrieved at step 172. The requested result from steps 166, 168, 170, and 172 are sent to the manager 4 at step 174.

Figure 10:
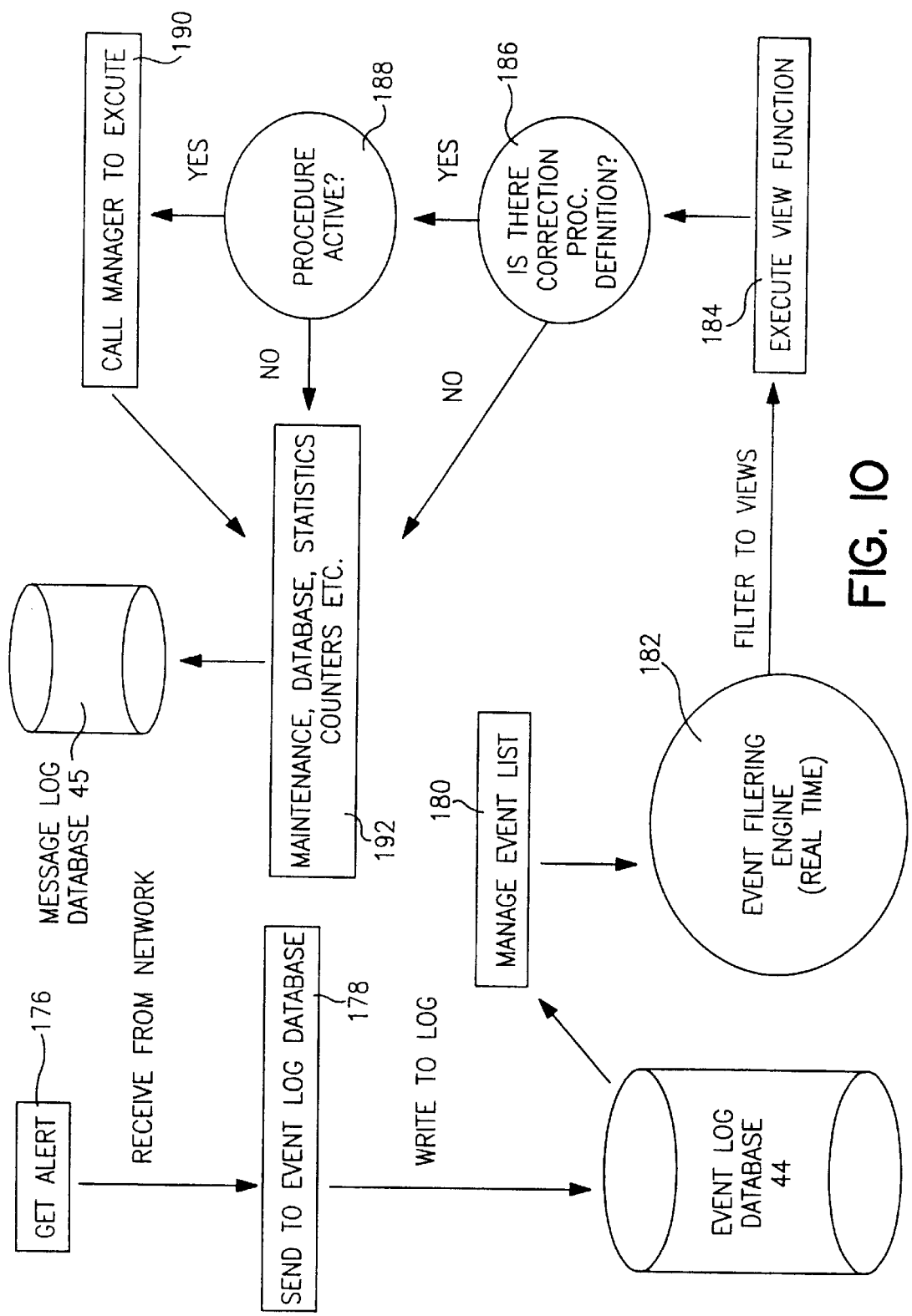
FIG. 10 is a flow diagram of a routine for the operation phase of the monitor used in the system of FIG. 1 in accordance with an embodiment of the present invention.

FIG. 10 is a flow diagram of a routine for the operation phase of the monitor 2 according to one embodiment of the present invention. At step 176, an alert is received from the network and sent to the event log database 44 at step 178. The event is then written to the event log database 44 containing a detailed descriptions of the event, such as the nature of the error, the name of the program, the location of the error, and recommendations for corrective action. The format of the event log database 44 can be as is described above. According to one embodiment of the present invention, every event that generates an alert is written to the event log database 44. A manage event list module 180 is provided which manages the list of events using the filters that have been set up by the network administrator. An event filtering engine 182 is provided in real time to filter the views. In other words, the manage event list module 180 is a database manager that places events into and retrieves events from the event log database 44. Real time event filtering engine 182 selects events from the event log database 44 for passage to the execute view function 184. The events are filtered to be displayed in various views. In particular, for each view that is set up by the network administrator, only certain of the alerts are to be displayed. The view function is executed at step 184.

For each event, it is determined at step 186 whether a correction procedure has been defined for that event. In other words, as described above, the network administrator, or the system by default, sets up triggers which are specific commands sent to the manager by the monitor to cause actions to be taken, generally by the agents. As described above, a correction procedure is a set of triggers that are executed in sequence in response to an event. For example, detection of a "Too many files" error would cause a correction procedure consisting of two triggers to be sent to the workstation, the first would be a trigger to modify the CONFIG.SYS file to increase the number of files. This would be followed by a reboot trigger to reboot the workstation for the change to take effect.

If a correction procedure has been defined to be executed in response to the alert received at step 176, it is determined at step 188 whether that correction procedure is active. In particular, the correction procedure, or set of triggers, are defined to be "active" or "inactive" by the user of the monitor. A particular procedure may be set inactive because the network administrator wishes to temporarily suspend the automatic correction feature for various reasons while continuing to log and view the events. If the procedure is active, the manager is called to execute the procedure at step 190. If the answer at steps 186 and 188 is negative or after the manager executes the trigger procedure at step 190, maintenance of the message log database 45 (containing the outcome of triggers, the statistics, the counters, etc.) is performed at step 192. In particular, counters of events, triggers, and the like are maintained to show the size of the databases and support the operation of the system. Additionally, the administrator is given an opportunity to define a correction procedure using the procedures manager 54 so that the next time the particular event occurs, a correction procedure will be executed.

Figure 11:
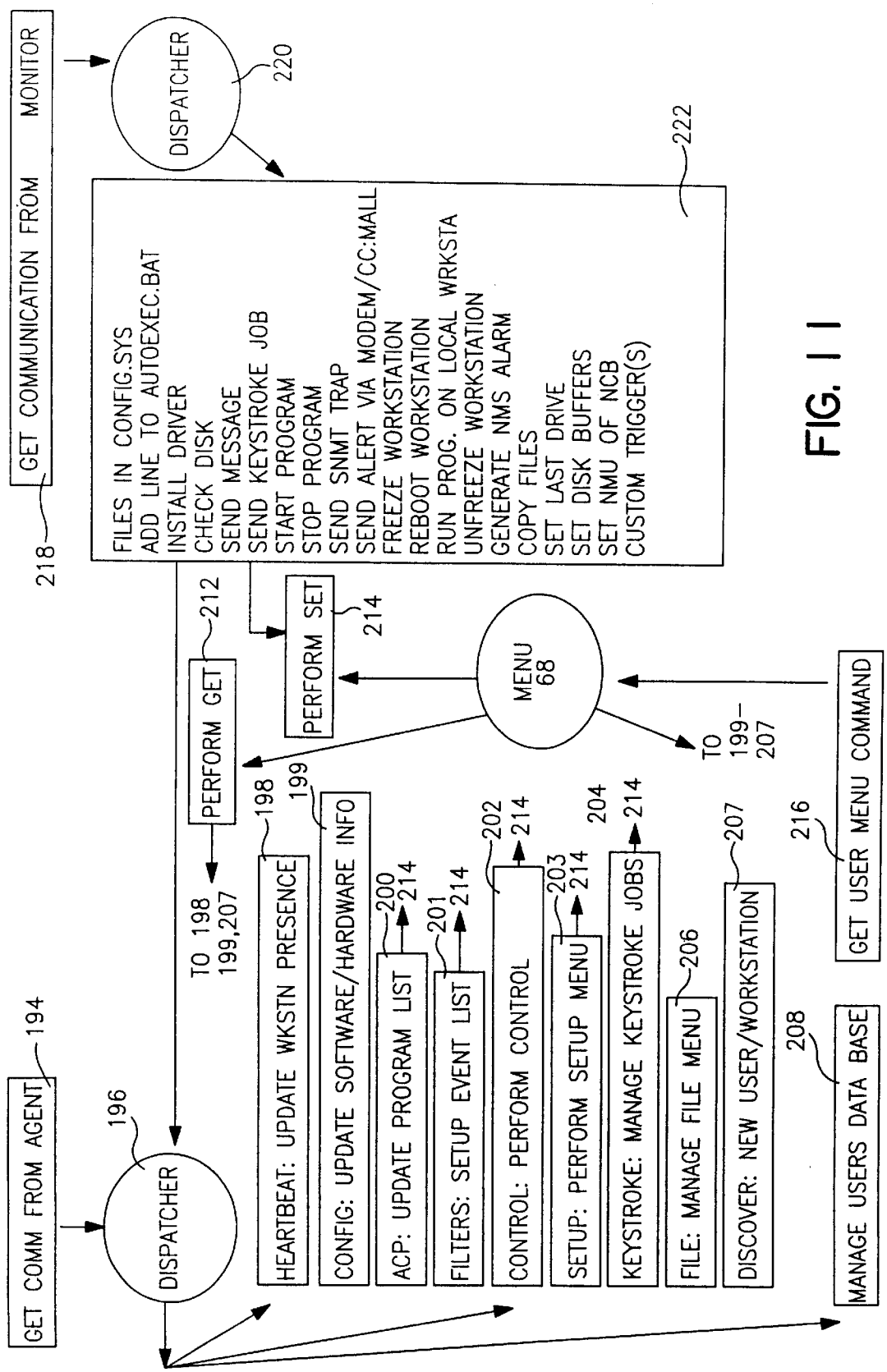
FIG. 11 is a flow diagram of a routine for the operation phase of the manager used in the system of FIG. 1 in accordance with an embodiment of the present invention.

FIG. 11 is a flow diagram of a routine for the operation phase of the manager 4 according to one embodiment of the present invention. The manager 4 either gets a communication from the agent 14 at step 194 or a communication from the monitor 2 at step 218. In either case, the communication is sent to a respective dispatcher 196 and 220.

If the communication is from the agent, the communication can be instructions to perform one or more of the modules 198 through 208. Module 198 is a heartbeat procedure which updates the status of workstation presence at predetermined intervals. According to one embodiment, the manager 4 is provided with a heartbeat at a predetermined frequency signifying that the agent 14 is active. According to one embodiment, a configurable parameter is provided which defines a heartbeat frequency in the range of from 1 to 80 seconds, with a default at 40 seconds. Module 199 is a configurable communication which updates the software and/or hardware information from the agent 14 concerning the agent's workstation. Module 200 is the ACP communication which updates the program list for the agent. Module 201 is the filter procedure which sets up the event table according to the determined filter. Module 202 is the control procedure which performs control according to the procedures listed in Tables 2 and 3.

Module 203 is a setup procedure which performs the setup menu. The setup menu includes setup procedures for the manager database, including, according to one embodiment, accessing the user list (i.e., managed workstations), monitoring undefined users (i.e., workstations with active agents which are not yet defined in the database), set default event tables for defined workstations, and set an index number for each agent type. The index numbers are numeric references to events and characteristics of events which are predefined and modifiable by the administrator. Module 204 forwards the keystrokes sent by the manage keystroke jobs trigger to the agents for execution. Module 206 provides access to the file menu. According to one embodiment, the file menu includes the following functions: show current agent parameters from the database (i.e., name, type, etc.), start monitor, and exit manager. Module 207 is the discovery procedure which is used when a new user or workstation is added to the network. The discovery module is executed upon receiving the identification packet concerning a newly active agent from the autodiscovery module 38 shown in FIG. 3. Finally, the module 208 manages the user's database 74.

If the communication is from the monitor 2 through the dispatcher 220, it can be one of the commands or triggers listed in Tables 2 and 3 or one or more custom triggers. According to the illustrated embodiment, the list shown in block 222 includes only those triggers listed in Table 2 plus custom trigger(s). It is within the skill of the ordinary artisan to add the triggers listed in Table 3 to this block once in possession of the present disclosure. The procedures are sent to the dispatcher 196 so that the various modules 198 through 207 can be executed to perform their respective functions.

In addition, the procedures in block 222 are sent via the perform set module 214 to be executed. The modules 200, 201, 202, 203, and 204 are also connected to the perform set module 214. The output of the perform get module 212 is sent to the modules 198, 199, or 207 as appropriate.

Menu 68 provides access by the network administrator to any of the modules 197–207 as well as the perform get module 212, perform set module 214, and get user menu command module 216. Module 212 performs the get operation to get information from a workstation as described above. Module 214 performs a set operation to set information or perform a trigger within a workstation as described above. Module 216 performs the procedure to get a user selection from the manager menu choices.

The following paragraphs describe two examples of how the system according to the present invention operates.

If an error occurs in execution of interrupt Int 17h (Table 1), indicating that the requested printer is unavailable, an alert is reported to the monitor 2. The alert is logged, and if not filtered or saturated, is displayed in the appropriate view preferably, in this case, a customized view of printing alerts. If a correction procedure for handling this alert has been defined, it will be sent to the manager 4 and then to the agent 14 which generated the alert. The correction procedure could include, for example, a trigger (6) to start capture application to redirect the printer to the network printer and a trigger (5) to send a message to the user to retry the print.

If an error occurs during execution of a NOS interrupt indicating an access is denied to a prospective user by the network operating system, an alert is reported to the monitor 2. As in the above example, the alert is logged, and if not filtered or saturated, is displayed in the appropriate view. If a correction procedure is defined, it will be sent to the manager 4 and then to the agent 14. The correction procedure could include a trigger (5) to send a message indicating an unauthorized access attempt followed by a trigger (11) to freezer the workstation.

The above description of FIGS. 1–11 illustrates one embodiment of the system according to the present invention comprising a generic agent and a management console provided to communicate with the generic agent. In addition, according to another embodiment of the present invention, a specific agent may be provided to handle errors or problems that may occur during execution of a specific program. For example, a specific agent may be provided to handle any errors occurring in the LOTUS™ cc:MAIL™ application. LOTUS™ cc:MAIL™ is an electronic mail program available from Lotus Development Corporation, in Cambridge, Mass. An example of an embodiment of such a specific agent is illustrated in FIGS. 12–15. As described, the specific agent must have the generic agent available on the workstation and defined in the management console to run. However, it is within the skill of the ordinary artisan to provide a combined generic and special agent to handle one or more specific programs as well as generic errors that may occur within workstations on the network once in possession of the present disclosure.

Figure 12:
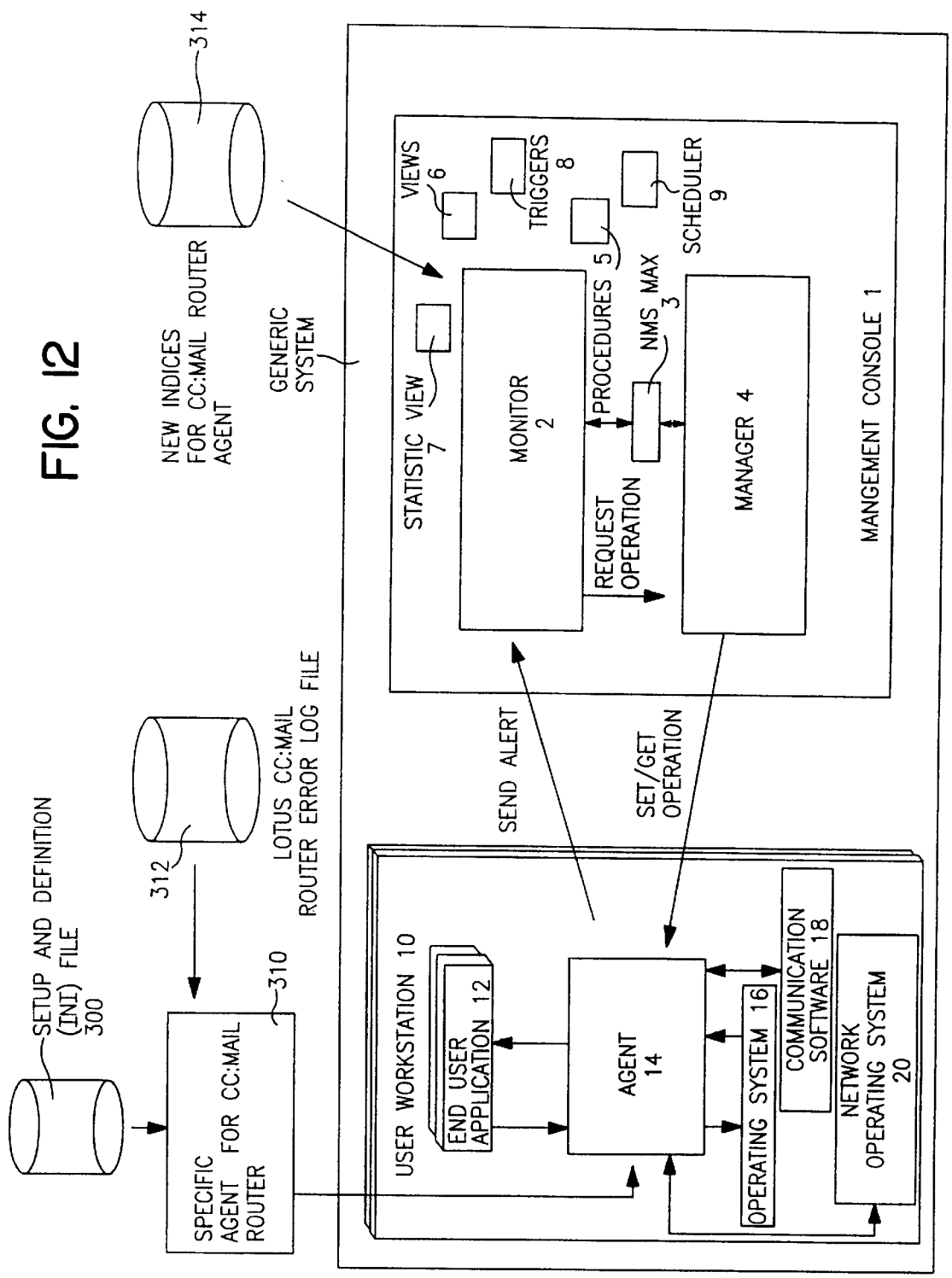
FIG. 12 is a block diagram of the network system for a specific agent in accordance with an embodiment of the present invention.

FIG. 12 is a block diagram of the system view of an exemplary special agent, in particular, the special agent for the cc:MAIL™ router. The cc:MAIL™ router is a program that directs electronic mail messages between electronic post offices. The specific agent for cc:MAIL™ routers monitors the operation of the cc:MAIL™ router and reports its status as well as the results of its communication, successful or unsuccessful. These reports can be used to initiate correction procedures in the same way as occurs with a generic agent. The various elements of the special agent are connected to the generic system and particularly to the agent 14 and monitor 2. In FIG. 12, like elements as those shown in FIG. 2 are labelled with like reference numerals.

First, a setup and definition file (.INI) is provided at block 300. The setup and definition file 300 contains the specification for handling the LOTUS™ cc:MAIL™ router error log file 312 and forwarding of events to the agents 14. This communicates with the special agent for cc:MAIL™ router which is provided in block 310. An error log file 312 is provided for tracking the events that occur during execution of the LOTUS™ cc:MAIL™ router. The specific agent 310 communicates with the agent 14 of the generic system via a standard send alert API as shown in FIG. 3. In addition, new indices in the form of a new index database is provided for the cc:MAIL™ router agent at block 314. The specific agent requires that additional, special purpose indices be added to this database. These indices are part of the user database (module 74 in FIG. 5). For each particular event there should be one index which describes this alert in text format in this database. Thus, when any specific agent is added to the system, this database contains an index definition for each of the alerts that this new specific agent can generate.

The specific agent may be loaded as a TSR program or as a non-TSR program. Embodiments for both installations are described.

Figure 13:
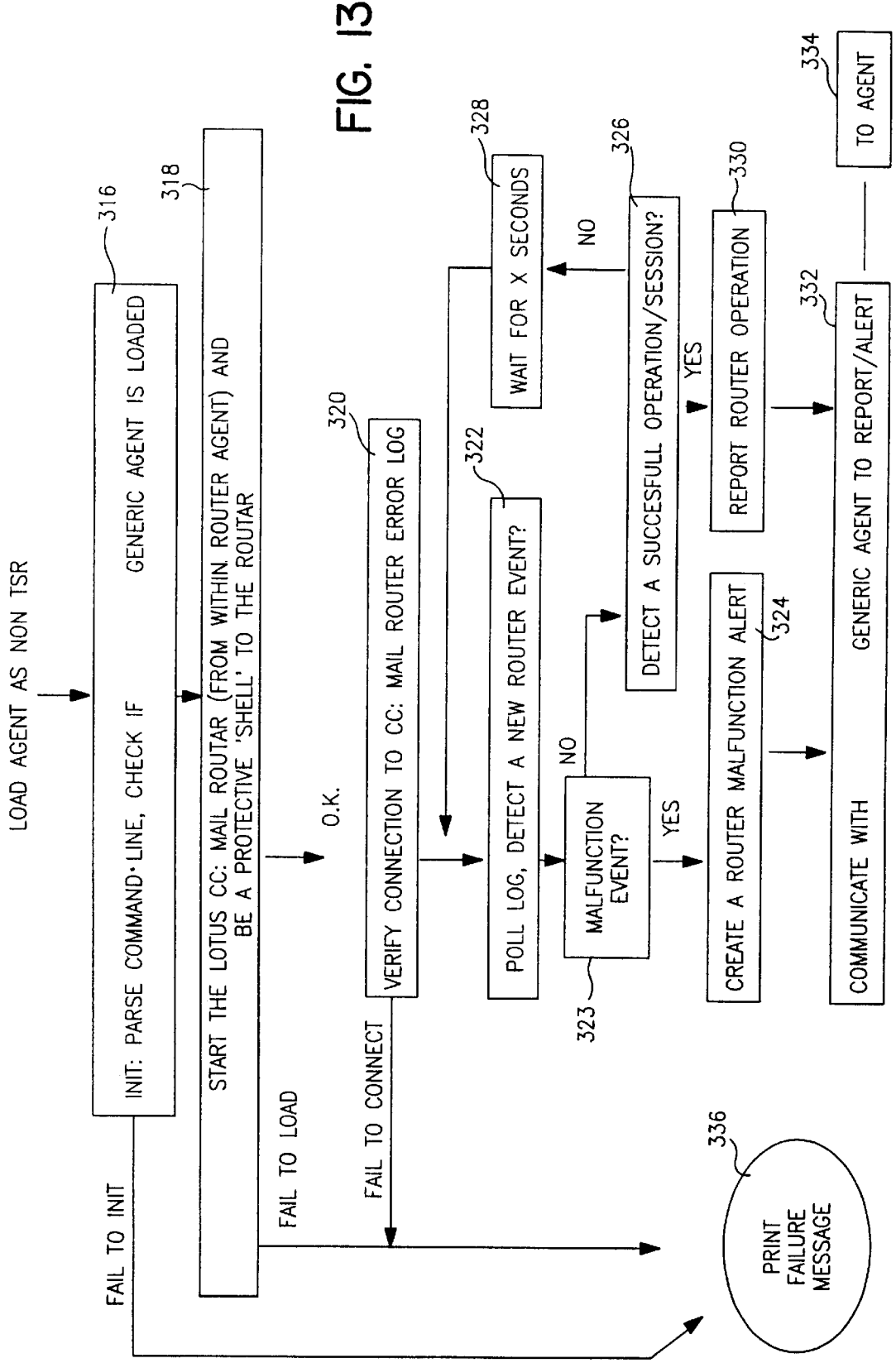
FIG. 13 is a flow diagram of a routine for the operation of the specific agent of FIG. 12 loaded as a non-TSR application in accordance with an embodiment of the present invention.

FIG. 13 illustrates a flow diagram of a routine for the cc:MAIL™ router specific agent which is loaded as a non-TSR application. First, the agent is loaded at step 316, followed by the initialization phase in which the command line is parsed, and a determination is made whether the generic agent is loaded. Next, at step 318, the LOTUS™ cc:MAIL™ router is started from within the specific agent. The specific agent acts as a protective shell to the router. That is, the specific agent is a program that, in effect, surrounds the router and is able to observe and/or control all external communication by the router. At step 320, the connection to the cc:MAIL™ router error log is verified and at step 322, the log is polled and a determination is made whether a new router event has occurred.

If at step 316, 318 or step 320, an error occurs, a failure message is printed at step 336. In particular, if the generic agent is not loaded at step 316, an error message "fail to initialize" is printed at step 336. If step 318 fails, a "fail to load" message is printed and if step 320 fails, a "fail to connect" message is printed.

At step 322, the router error log is polled and a determination is made whether a new router event is detected. If a router event is determined to be an error in step 323, a router malfunction alert is created at step 324. If no problem is detected, a determination is made whether a successful operation or session has occurred at step 326. If not, a wait state is entered for a predetermined number of seconds at step 328. According to one embodiment, this wait state is entered for 3 seconds, although this value can be changed. After the predetermined number of seconds has elapsed, control passes again to step 322 to determine whether a new router event has occurred. If a successful operation or session is detected at step 326, the router operation is reported at step 330. At step 332, the generic agent 14 is accessed to report the alert or router operations from steps 324 and 330, respectively. Control then passes to the generic agent 14 at step 334.

Figure 14:
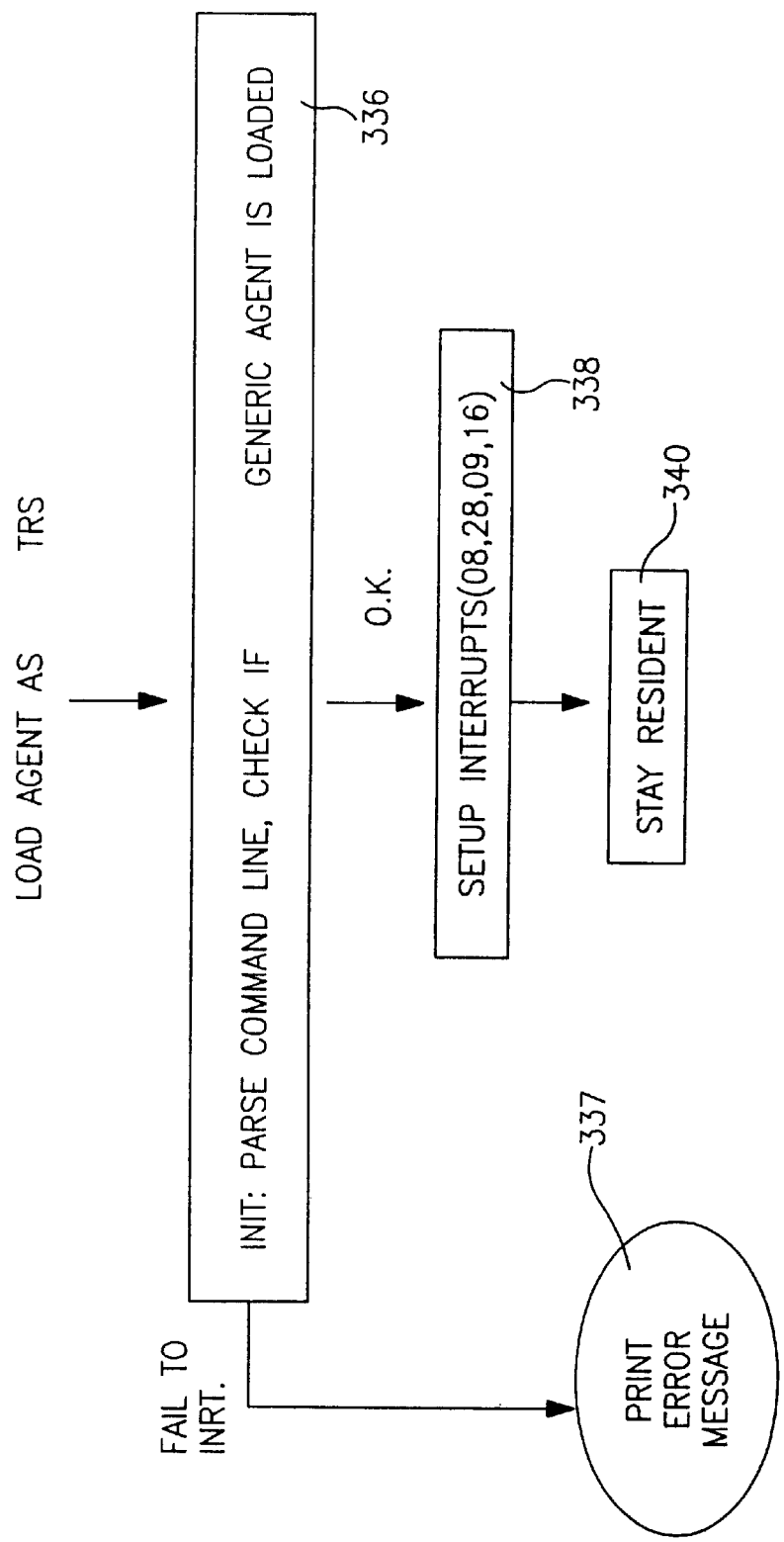
FIG. 14 is a flow diagram of a routine for the initialization phase of the operation of the specific agent of FIG. 12 loaded as a TSR application in accordance with an embodiment of the present invention.

FIG. 14 is a flow diagram of a routine for the initialization phase for the specific agent cc:MAIL™ router which is loaded as a DOS™ TSR program. First, the command line is parsed and a determination is made whether the generic agent is loaded at step 336. If the generic agent is not loaded, a "fail to initialize" error message is printed at step 337. If so, the interrupts listed in Table 1 are set up at step 338. In particular, interrupts 08h, 28h, 09h, and 16h are set up. Step 340 is then executed which allows the cc:MAIL™ router specific agent to stay resident in memory.

Figure 15:
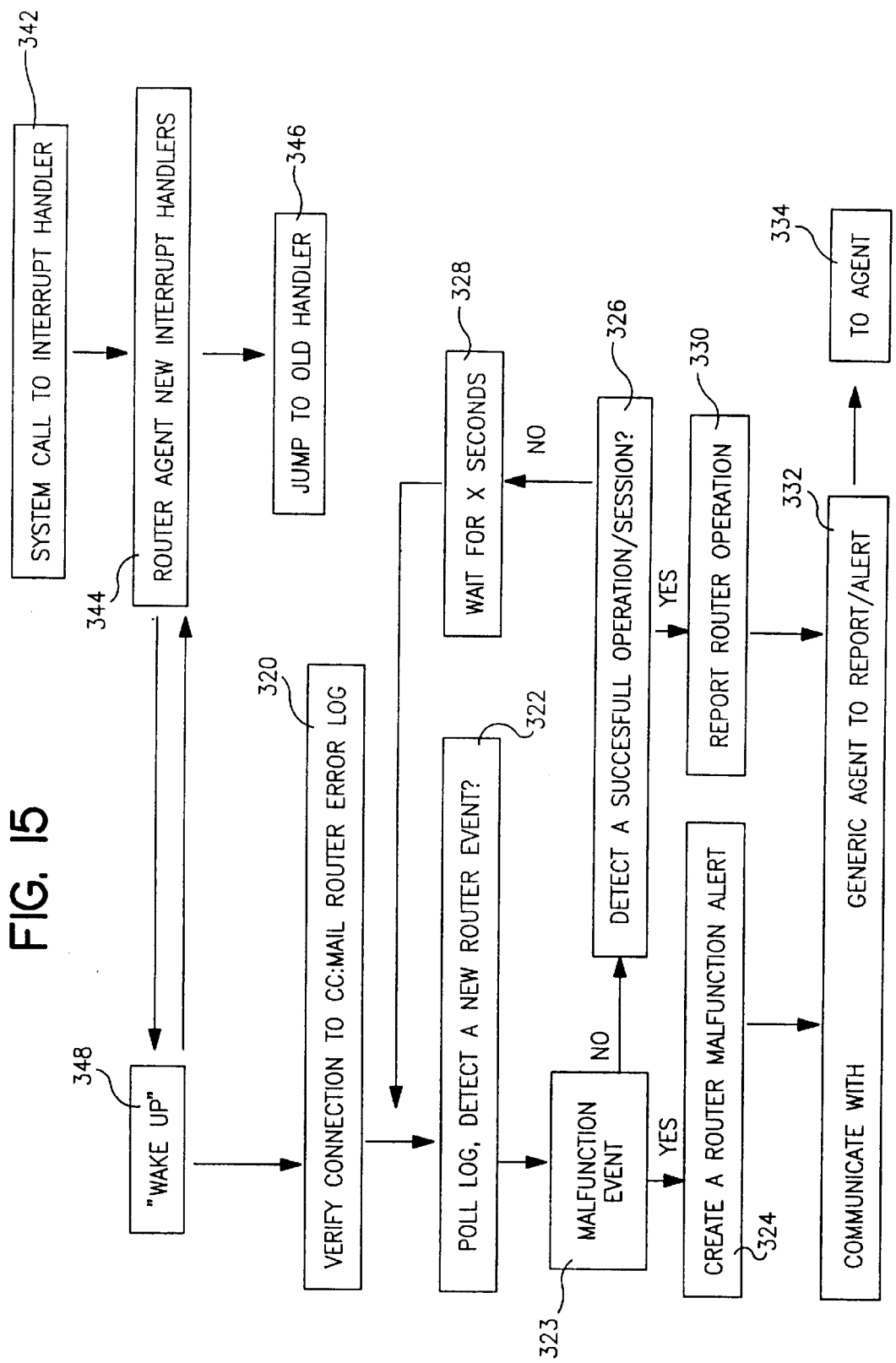
FIG. 15 is a flow diagram of a routine for the operation phase of the specific agent of FIG. 13 loaded as a TSR application in accordance with an embodiment of the present invention.

FIG. 15 is a flow diagram of a routine for the operation phase of the cc:MAIL™ router specific agent loaded as a DOS™ TSR. When a system call to the interrupt handler is detected at step 342, the router agent interrupt handlers are accessed at step 344. Step 346 performs a jump to the old interrupt handler. Step 348 causes the TSR to wake up. That is, the jump in step 346 to the old interrupt handler returns control to the LOTUS™ cc:MAIL™ router program so that it can complete its normal function. The wake up function in step 348 stimulates the specific agent TSR to begin its operation of analyzing and reporting the event. In particular, according to one embodiment, a timer interrupt handler for cc:MAIL™ router specific agent is provided which gets control from the system 18 times per second through block 342 in FIG. 15. Then, in the block 344, the cc:MAIL™ router specific agent decides if a specified time from the last wake up (or beginning of the work) has passed. If so, it invokes block 348 to wake up the specific agent. The specified time is determined by the wait state parameter described above. If the specified time has not passed, block 344 invokes block 348 to perform a jump to the old timer interrupt handler (i.e., the system timer).

After the TSR is woken up at step 348, the cc:MAIL™ router specific agent process is performed in the same way as described above with respect to FIG. 13. Because the operations are the same, they will not be described again but are noted in the figure with the same reference numbers as used in FIG. 13.

The software modules described above may be provided for operation with PC-DOS™, MS-DOS™, WINDOWS™, OS/2™, or other comparable operating systems. According to one embodiment, the present invention requires 4 MB RAM in the management console, 8 MB hard disk space, MICROSOFT™ WINDOWS™ 3.0 or later, NOVELL™ NETWARE™ 2.2 or above, IBM™ LAN Server, MICROSOFT™ LAN manager, or any other NetBIOS™, IPX™, DLC™, or TCP/IP™ compatible network. The detailed implementation of the software modules is within the skill of the ordinarily skilled artisan once in possession of the present disclosure. In addition, any modifications required to run the software modules on other systems is also within the skill of the ordinarily skilled artisan once in possession of the present disclosure.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method comprising:

receiving an alert by a management console in response to an event;

identifying at least one procedure stored in said management console in response to said event;

sending said at least one procedure including a plurality of stored triggers from said management console to an agent module resident on a workstation over a network, said plurality of stored triggers including at least one trigger chosen from a trigger library including at least one trigger selected from the group consisting of add a line to an AUTOEXEC batch file, install a driver, check a disk for bad sectors, send a SNMP trap, send an alert via modem, send an alert via email, send an alert via pager, run a program on a local workstation, generate a NMS alarm, copy files, set a last drive, set a number of disk buffers, stop a program by name, pause, stop a program executing during an alert generation, set a number of network control blocks, copy an alert to a database, copy an alert to a text file, and copy an alert to a printer file; and automatically launching said at least one procedure within said workstation for processing said event by executing the plurality of triggers at scheduled times, each of said plurality of triggers adapted to cause a specific corrective action in response to the event.

2. A method comprising:

identifying an event occurring with respect to a program executing on a workstation;

sending an alert to a management console which identifies said event;

identifying at least one procedure stored in said management console;

identifying a plurality of stored triggers in said procedure, said plurality of stored triggers including at least one trigger chosen from a trigger library including at least one trigger selected from the group consisting of add a line to an AUTOEXEC batch file, install a driver, check a disk for bad sectors, send a SNMP trap, send an alert via modem, send an alert via email, send an alert via pager, run a program on a local workstation, generate a NMS alarm, copy files, set a last drive, set a number of disk buffers, stop a program by name, pause, stop a program executing during an alert generation, set a number of network control blocks, copy an alert to a database, copy an alert to a text file, and copy an alert to a printer file;

sending said plurality of stored triggers from said management console to an agent module resident on said workstation in response to said alert; and automatically launching at scheduled times said plurality of stored triggers in at least two workstations in response to said event, each of said plurality of triggers adapted to cause a specific corrective action in response to the event.

3. An article of manufacture for use in a digital processing system for allowing an implementation in responsive to execution of a network program, the article of manufacture comprising a digital processing system usable medium having readable program code embodied in the medium, the program code comprising:

receiving an alert by a management console in response to an event;

identifying at least one procedure stored in said management console in response to said event;

sending said at least one procedure including a plurality of stored triggers from said management console to an agent module resident on a workstation in a network, said plurality of stored triggers including at least one trigger chosen from a trigger library including at least one trigger selected from the group consisting of add a line to an AUTOEXEC batch file, install a driver, check a disk for bad sectors, send a SNMP trap, send an alert via modem, send an alert via email, send an alert via pager, run a program on a local workstation, generate a NMS alarm, copy files, set a last drive, set a number of disk buffers, stop a program by name, pause, stop a program executing during an alert generation, set a number of network control blocks, copy an alert to a database, copy an alert to a text file, and copy an alert to a printer file; and automatically launching said at least one procedure within said workstation for processing said event by executing the plurality of triggers at scheduled times, each of said plurality of triggers adapted to cause a specific corrective action in response to the event.

4. A system for monitoring and controlling at least one program being executed on any of at least two workstations in a network, said system comprising:

means for identifying an event occurring with respect to a program executing on one of said at least two workstations;

means for sending an alert to a management console which identifies said event;

means for storing at least one procedure, said at least one procedure including a plurality of stored triggers, said plurality of stored triggers including at least one trigger chosen from a trigger library including at least one trigger selected from the group consisting of add a line to an AUTOEXEC batch file, install a driver, check a disk for bad sectors, send a SNMP trap, send an alert via modem, send an alert via email, send an alert via pager, run a program on a local workstation, generate a NMS alarm, copy files, set a last drive, set a number of disk buffers, stop a program by name, pause, stop a program executing during an alert generation, set a number of network control blocks, copy an alert to a database, copy an alert to a text file, and copy an alert to a printer file;

means for sending said at least one procedure from said management console to an agent module resident on said one of said at least two workstations in response to receipt of said alert; and means for automatically launching at scheduled times said plurality of stored triggers in said at least one procedure, each of said plurality of stored triggers adapted to cause a specific corrective action in response to the event.

5. The system according to claim 4, further comprising:
means in said management console for scheduling performance of selected ones of said at least one procedure at specific times; and
means in said management console for sending said selected ones of said at least one procedure from said management console to at least one of said at least one agent modules at said specific times.

6. The system according to claim 4, wherein one of said plurality of triggers comprises sending at least one keystroke job from said management console to said at least two workstations.

7. The system according to claim 4, further comprising means, in said management console, for providing remote access to said at least two workstations to enable said management console to take and release control of said at least two workstations.

8. The system according to claim 4, wherein one of said plurality of triggers comprises starting programs on said at least two workstations and another of said plurality of triggers comprises stopping executing programs on said at least two workstations.

9. The system according to claim 4, further comprising means for providing mapping integration with a network management system.

10. The system according to claim 4, further comprising an application control means in said management console for launching and executing capture of said at least two workstations in a background operation of said at least two workstations wherein said capture is accomplished without affecting any program executing in a foreground operation of said at least two workstations.

11. A system for monitoring and controlling at least one program in a network, said network comprising at least two workstations and a management console connected to each of said at least two workstations, said system comprising:
at least one generic agent means resident on said workstations for transmitting alerts indicating occurrence of an event with a program executing on the workstation;
a monitor means resident on said management console for logging alerts transmitted by any of said at least one generic agent;
at least one procedure resident on said management console, said procedure including a plurality of stored triggers, said plurality of stored triggers including at least one trigger chosen from a trigger library including at least one trigger selected from the group consisting of add a line to an AUTOEXEC batch file, install a driver, check a disk for bad sectors, send a SNMP trap, send an alert via modem, send an alert via email, send an alert via pager, run a program on a local workstation, generate a NMS alarm, copy files, set a last drive, set a number of disk buffers, stop a program by name, pause, stop a program executing during an alert generation, set a number of network control blocks, copy an alert to a database, copy an alert to a text file, and copy an alert to a printer file;
a manager coupled to said at least one generic agent for monitoring and controlling operations of said at least one generic agent, said manager further configured to send at least one procedure to said at least one generic agent in response to an alert; and
said one of said at least two workstations configured to automatically launch at schedule times said plurality of stored triggers in said at least one procedure, each of said plurality of triggers adapted to cause a specific corrective action in response to the event.

12. The system according to claim 11, wherein said plurality of triggers comprise a plurality of predefined triggers and user defined triggers.

13. The system according to claim 11, further comprising means in one of said at least two workstations for sending a heartbeat to said manager means from said at least one generic agent means at a predetermined frequency signifying that said at least one generic agent means is active.

14. The system according to claim 11, further comprising:
means in said manager means for scheduling performance of selected ones of said at least one procedure at desired times; and
means in said manager means for sending said selected ones of said at least one procedure from said monitor means to at least one of said at least one generic agent means at said desired times.

15. The system according to claim 11, wherein one of said plurality of triggers comprises sending at least one keystroke job from said manager means to said at least two workstations.

16. The system according to claim 11, further comprising means, in said manager means, for providing remote access to said at least two workstations to enable said manager means take and release control of said at least two workstations.

17. The system according to claim 11, wherein one of said plurality of triggers comprises starting programs on said at least two workstations and another of said plurality of triggers comprises stopping executing programs on said at least two workstations.

18. The system according to claim 11, further comprising means in said manager means for providing mapping integration with a network management system.

19. The system according to claim 11, further comprising receiver and transmitter means for connecting said at least one generic agent means with said network using one of a plurality of network communication protocols.

20. The system according to claim 11, wherein said monitor means comprises means in said manager means for maintaining statistical views for displaying information concerning alert statistics.

21. The system according to claim 11, further comprising an application control means in said manager means for launching and executing capture of said at least two workstations in a background operation of said at least two workstations wherein said capture is accomplished without affecting any program executing in a foreground operation of said at least two workstations.

22. The system according to claim 13, wherein said predetermined frequency is determined by a configurable parameter which ranges from 1 to 80 seconds, with a default of 40 seconds.

23. The method according to claim 21, further comprising providing mapping integration with a network management system.

24. A method for monitoring and controlling at least one program capable of being executed on any of at least two workstations in a network, said network comprising at least one agent module resident on each of said at least two workstations and a management console connected to each of said at least two workstations, said method comprising:
storing in said management console at least one procedure, said at least one procedure comprising a plurality of stored triggers, said plurality of stored triggers including at least one trigger chosen from a trigger library including at least one trigger selected from the group consisting of add a line to an AUTOEXEC batch file, install a driver, check a disk for bad sectors, send a SNMP trap, send an alert via modem, send an alert via email, send an alert via pager, run a program on a local workstation, generate a NMS alarm, copy files, set a last drive, set a number of disk buffers, stop a program by name, pause, stop a program executing during an alert generation, set a number of network control blocks, copy an alert to a database, copy an alert to a text file, and copy an alert to a printer file;

identifying an event occurring on one of said at least two workstations;

sending an alert to said management console which identifies said event;

sending at least one of said procedures from said management console to said agent module resident on said one of said at least two workstations in response to receipt of said alert; and automatically launching at scheduled times, in said one of said at least two workstations, said plurality of stored triggers in said at least one procedure, each of said plurality of triggers adapted to cause a specific corrective action in response to the event.

25. The method according to claim 24, further comprising:

scheduling in said management console performance of selected ones of said at least one procedure at desired times; and sending said selected ones of said at least one procedure from said management console to at least one of said at least one agent modules at said desired times.

26. The method according to claim 24, wherein one of said plurality of triggers in said management console comprises sending at least one keystroke job from said management console to said at least two workstations.

27. The method according to claim 24, further comprising providing remote access by said management console to said at least two workstations to enable said management console to take and release control of said at least two workstations.

28. The method according to claim 24, wherein one of said plurality of triggers in said management console comprises starting programs on said at least two workstations and another of said plurality of triggers comprises stopping executing programs on said at least two workstations.

* * * * *